(12) United States Patent
Moos et al.

(10) Patent No.: US 11,913,330 B2
(45) Date of Patent: Feb. 27, 2024

(54) METHOD OF MEASURING RESERVOIR AND FRACTURE STRAINS, CROSSWELL FRACTURE PROXIMITY AND CROSSWELL INTERACTIONS

(71) Applicant: Seismos, Inc., Austin, TX (US)

(72) Inventors: Daniel Moos, Palo Alto, CA (US); Jakub Felkl, Bedford, NH (US); Hossein Davari Ardakani, Austin, TX (US); Ibrahim Said Abou-Sayed, Sugar Land, TX (US)

(73) Assignee: Seismos, Inc., Austin, TX (US)

( * ) Notice: Subject to any disclaimer, the term of this patent is extended or adjusted under 35 U.S.C. 154(b) by 90 days.

(21) Appl. No.: 17/732,907

(22) Filed: Apr. 29, 2022

(65) Prior Publication Data
US 2022/0325621 A1 Oct. 13, 2022

Related U.S. Application Data

(63) Continuation of application No. PCT/US2020/058167, filed on Oct. 30, 2020.

(60) Provisional application No. 62/928,883, filed on Oct. 31, 2019.

(51) Int. Cl.
*E21B 49/00* (2006.01)
*E21B 47/06* (2012.01)

(52) U.S. Cl.
CPC ............ *E21B 49/006* (2013.01); *E21B 47/06* (2013.01)

(58) Field of Classification Search
CPC ...... E21B 49/006; E21B 47/06; E21B 47/095; E21B 43/26; G01V 1/50; G01V 2210/646; G01V 2210/663
See application file for complete search history.

(56) References Cited

U.S. PATENT DOCUMENTS

| | | | | |
|---|---|---|---|---|
| 11,015,436 | B2* | 5/2021 | Adamopoulos | G01V 1/308 |
| 11,492,899 | B2* | 11/2022 | Jaaskelainen | E21B 47/18 |
| 2006/0102342 | A1* | 5/2006 | East | E21B 47/01 |
| | | | | 166/250.1 |
| 2013/0079935 | A1* | 3/2013 | Kabannik | G05D 7/00 |
| | | | | 700/282 |

(Continued)

FOREIGN PATENT DOCUMENTS

| WO | 2018/217201 A1 | 11/2018 |
|---|---|---|
| WO | 2019/089977 A1 | 5/2019 |

OTHER PUBLICATIONS

Canadian Office Action dated Jun. 7, 2023, for Canadian Application No. 3,158,922.

(Continued)

*Primary Examiner* — Steven A MacDonald
(74) *Attorney, Agent, or Firm* — Richard A. Fagin

(57) ABSTRACT

A method for determining change in stress in a reservoir formation includes inducing a pressure pulse in a first well hydraulically connected by a fracture to the reservoir formation. A stress-related attribute of the fracture is determined from reflection events detected in pressure measurement made in the first well as a result of the inducing the pressure pulse. The inducing and determining are repeated to estimate changes in the stress-related attribute with respect to time. A method for determining and localizing type of interaction between a treated well and an observation well by monitoring pressure and fracture changes in the observation well.

18 Claims, 18 Drawing Sheets

(56) References Cited

U.S. PATENT DOCUMENTS

| | | | |
|---|---|---|---|
| 2014/0202687 A1* | 7/2014 | Dorovsky | E21B 43/26 |
| | | | 166/250.1 |
| 2014/0246194 A1 | 9/2014 | Artus | |
| 2014/0262232 A1* | 9/2014 | Dusterhoft | E21B 47/06 |
| | | | 166/250.1 |
| 2015/0075778 A1* | 3/2015 | Walters | E21B 49/008 |
| | | | 166/250.1 |
| 2015/0354337 A1* | 12/2015 | Ersoz | E21B 47/14 |
| | | | 166/250.1 |
| 2016/0123126 A1* | 5/2016 | Portman | E21B 43/26 |
| | | | 166/250.01 |
| 2016/0139588 A1* | 5/2016 | Huang | G05B 19/19 |
| | | | 700/275 |
| 2016/0146963 A1* | 5/2016 | Hall | G01V 1/42 |
| | | | 166/250.1 |
| 2018/0094521 A1* | 4/2018 | Adamopoulos | E21B 47/18 |
| 2018/0203143 A1* | 7/2018 | Hall | E21B 43/263 |
| 2018/0320514 A1* | 11/2018 | Felkl | G01V 1/48 |
| 2019/0129047 A1 | 5/2019 | Clark et al. | |
| 2019/0146115 A1* | 5/2019 | Mayo | G01V 1/42 |
| | | | 702/6 |
| 2019/0310386 A1 | 10/2019 | Quan et al. | |
| 2020/0190976 A1* | 6/2020 | Jaaskelainen | E21B 47/06 |
| 2021/0040841 A1 | 2/2021 | Dusterhoft et al. | |
| 2022/0082004 A1* | 3/2022 | Bannikov | E21B 43/267 |

OTHER PUBLICATIONS

International Search Report and Written Opinion, International Application No. PCT/US2020/058167 dated Apr. 15, 2021.

\* cited by examiner

1010. Observation well, $W_{obs}$ is instrumented in anticipation of a nearby well, $W_{treat}$, being treated 1020. Pressure in $W_{obs}$ is monitored and periodic tube waves are generated and their acoustic reflection signatures recorded 1030. Periodically invert acoustic pulse reflection measurements from 1020 in observation well to sensing fracture width $w_{sense}$ (or other property)

1040. Over time, observe the combined change (trends) of pressure with the $w_{senseb}$ trends; if changes, arrive at the type of interaction.

1041. Decreasing or flat pressure and fracture width over time indicate no interaction.

1042. $P_{obs}$ increases strongly, $w_{sense}$ increases, then both stabilize. Fractures connecting and connected.

1043. $w_{sense}$ increases along with a $P_{obs}$ decrease. Fractures tips interact (no bypass).

1044. $P_{obs}$ increases, $w_{sense}$ decreases. Fractures bypass.

1050. Alert operator of type of interaction occurring. Warn operator if any abrupt change occurs in pressure or measured fracture width 1060. Adjust treatment operations in $W_{treat}$ to mitigate negative impact on reservoir stimulation 1070. Continuously repeat steps 1020-1060 until treatment of $W_{treat}$ is finished

FIG. 10

METHOD OF MEASURING RESERVOIR AND FRACTURE STRAINS, CROSSWELL FRACTURE PROXIMITY AND CROSSWELL INTERACTIONS

CROSS REFERENCE TO RELATED APPLICATIONS

Continuation of International Application No. PCT/US2020/058167 filed on Oct. 30, 2020. Priority is claimed from U.S. Provisional Application No. 62/928,883 filed on Oct. 31, 2019. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic analysis of hydraulic fractures as well as well operations such as hydraulic fracturing process monitoring and evaluation. In particular, the disclosed monitoring can be performed in real time while hydraulic stimulation takes place, and additional analysis of the data used in the monitoring can be performed at a later time. The disclosed methods are also applicable to measuring changes in reservoir properties occurring once a well has been put on production and in a case of multiple wells being completed or operated on to identify various mutual cross-well interactions.

When producing from or stimulating a hydrocarbon reservoir, operators often choose to design treatments for multiple offset wellbores for higher recovery and rates. In some cases, an in-fill well (daughter well), which may be deviated or vertical, is drilled in the same or nearby formation near an existing well. In other cases, horizontal or deviated wells are spaced approximately parallel to each other to traverse a hydrocarbon reservoir formation to optimize recovery and costs. An optimum in-fill well, located between two existing wells or at optimal between-well spacing will not affect production from nearby wells, yet will produce sufficient amounts of hydrocarbon to be economical. However, that is often not the case. In-fill or daughter wells can reduce (cannibalize) production from other wells in the same reservoir, and if between-well spacing is too dense or too sparse, it may result in reduced per-well production or reduced overall reservoir production, respectively.

Since wells in certain types of hydrocarbon reservoirs are stimulated to increase reservoir permeability and/or effective wellbore radius in the hydrocarbon reservoir, it is important to know the extent of any fracture network, i.e., how far each treatment (or fracture network) extends into the reservoir from any particular well or the extent of its drainage area. When performing hydraulic fracturing or any other stimulation treatment, it is of importance to understand how far away from the treatment wellbore the treatment effects take place, as spacing wells too close reduces recovery efficiency. From that perspective, the operators will try to avoid "frac hits" which would pump proppant and fluid into a nearby wellbore instead of extending a new fracture network to open up additional rock to production. Thus, knowing fracture length, geometry (height), or more generally a distance of fracture "effects" (effective fracture length, or strain-effects), a fracture tip location with respect to or proximity to neighboring wells, and related parameters are of importance to the reservoir operator. If an operator can determine not only the approximate approach, location, but also type of between-well interaction (stress shadowing vs. direct connection), the operator can make adjustments to treated wells to achieve desired results of stimulating new rock rather than already existing fracture network of another wellbore.

SUMMARY

A method for determining change in stress in a reservoir formation according to one aspect of this disclosure includes inducing a pressure pulse in a first well hydraulically connected by a first fracture to the reservoir formation. A stress-related attribute of the first fracture is determined from reflection events detected in pressure measurements made in the first well as a result of the inducing the pressure pulse. The inducing and determining are repeated to estimate changes in the stress-related attribute with respect to time.

In some embodiments, the stress-related attribute comprises a proximity of a second fracture in the reservoir formation.

In some embodiments, stress-related attribute comprises a location of a fracture tip of the second fracture.

In some embodiments, the second fracture is induced by pumping a treatment into a second well connected to the reservoir formation.

In some embodiments, the second fracture is induced by pumping a treatment into an interval in the first well isolated from first fracture.

In some embodiments, the stress-related attribute comprises propagation with respect to time of the second fracture.

Some embodiments further comprise repeating the inducing a pressure pulse and determining the stress-related attribute while pumping the treatment into the second well.

Some embodiments further comprise treating the reservoir formation by pumping a treatment into the reservoir formation from the first well, and inducing a pressure pulse and determining the stress-related attribute in the second well.

In some embodiments, the first fracture connecting the first well is induced by a hydraulic fracturing treatment.

In some embodiments, the first fracture is induced by a performing a diagnostic fracture injection test on the first well.

In some embodiments, the first fracture is induced by injection of a fluid of known volume into the first well.

In some embodiments, the first fracture comprises a pre-existing natural fracture.

In some embodiments, the stress-related attribute comprises at least one of fracture width, fracture length, fracture height and fracture permeability.

In some embodiments, the pressure pulse induces tube waves in the first well.

Some embodiments further comprise inducing a pressure pulse in a third well, and determining the stress-related attribute of the fracture from reflection events detected in pressure measurement made in the third well as a result of the inducing the pressure pulse in the third well.

Some embodiments further comprise repeating the inducing and determining in the third well and estimating changes in the stress-related attribute with respect to time.

A method for determining change in near-wellbore stresses according to another aspect of this disclosure includes measuring at least one of pressure and rate of change of pressure with respect to time in at least a first well and in at least a second well within a selected distance of the first well. At least one of the first well and the second well is treated by pumping fluid into the at least one of the first well and the second well. A pressure disturbance is generated in the first well. From the measured pressure or rate of change of pressure, changes in a wellbore-connected fracture are determined, and from the changes in the wellbore-connected fracture, changes in near-wellbore stress regime in the second well are determined;

In some embodiments, the inducing a pressure disturbance comprises operating at least one of an acoustic source and a pressure source proximate the surface.

In some embodiments, at least one of fracture length and fracture geometry and fracture extent from the first well is determined by measuring at least one of changes in fracture geometry or stress-regimes in the second well.

Some embodiments further comprise monitoring a stress decrease due to fluid production from the first well.

A method for characterizing propagation of a fracture in a subsurface reservoir according to another aspect of this disclosure includes measuring fluid pressure and a parameter related to fracture width in a first well penetrating a subsurface reservoir. Fluid is pumped into a second well penetrating the subsurface reservoir. The measuring fluid pressure and the parameter related to fracture width is repeated at selected times during the pumping; and a propagation characteristic of a fracture induced in the second well is determined from the repeated measuring pressure and parameter related to fracture width.

In some embodiments, the propagation characteristic comprises no interaction between the fracture in the first well and the induced fracture.

In some embodiments, the propagation characteristic comprises the fracture in the first well and the induced fracture connecting.

In some embodiments, the propagation characteristic comprises a tip of the fracture in the first well and a tip of the induced fracture interacting.

In some embodiments, the propagation characteristic comprises induced fracture bypassing the fracture in the first well.

In some embodiments, the propagation characteristic comprises a tip of the fracture in the first well and a tip of the induced fracture first interacting, and then the fracture in the first well either connecting to or bypassing the induced fracture.

In some embodiments, the measuring a parameter related to fracture width comprises inducing tube waves in the first well and detecting reflections from the tube waves.

In some embodiments, the pumping fluid into the second well comprises pumping hydraulic fracturing fluid into the second well.

Some embodiments further comprise changing at least one parameter of pumping the hydraulic fracturing fluid in response to the determined propagation characteristic.

Another aspect of the disclosure relates to a method for characterizing propagation of a fracture in a subsurface reservoir. Such method includes measuring fluid pressure in a first well penetrating a subsurface reservoir. The first well is closed to fluid flow both to the subsurface reservoir and to surface. Fluid is pumped into a second well penetrating the subsurface reservoir to induce a fracture in the subsurface reservoir. The measuring fluid pressure is repeated at selected times in the first well during the pumping. An effect of the fracture induced in the second well is determined from changes in measured pressure in the first well.

In some embodiments, the effect comprises a distortion of a casing in the first well.

A method according to another aspect of this disclosure relates to determining interaction between a fracture induced in a first well by pumping fluid into a subsurface reservoir through the first well and a completed fracture treatment stage in a second well. The second well has a one way valve above the completed fracture treatment state. The method includes measuring pressure in the second well on a side of the one way valve opposed to the completed fracture treatment stage, while continuing pumping the fluid through the first well. A change in pressure is detected in the second well resulting from interaction of the fracture in the first well and the completed fracture treatment stage in the second well.

Some embodiments further comprise inducing tube waves in the second well. And determining a position in the second well of the one way valve by detecting reflections of the tube waves.

Other aspects and possible advantages will be apparent from the description and claims that follow.

BRIEF DESCRIPTION OF THE DRAWINGS

FIG. 1 depicts an example of two nearby horizontal wells: a treatment well, $W_{treat}$, with an "emanating fracture" 108 and an observation well $W_{obs}$, with a "sensing feature", in this case a sensing fracture 111. Both wells may be drilled in a reservoir formation such that they have a potential to hydraulically interact with each other, along with schematic fractures and their interaction marked by a star at 110. The observation well $W_{obs}$ shows example embodiments of instrumentation. In a "zipper frac" procedure, to be further explained below, the instrumentation on both wells may be similar.

FIG. 10 shows a flow chart of a method incorporating pressure measurements in an observation well to determine the type of cross-well fracture interaction occurring.

DETAILED DESCRIPTION

Figure 1:
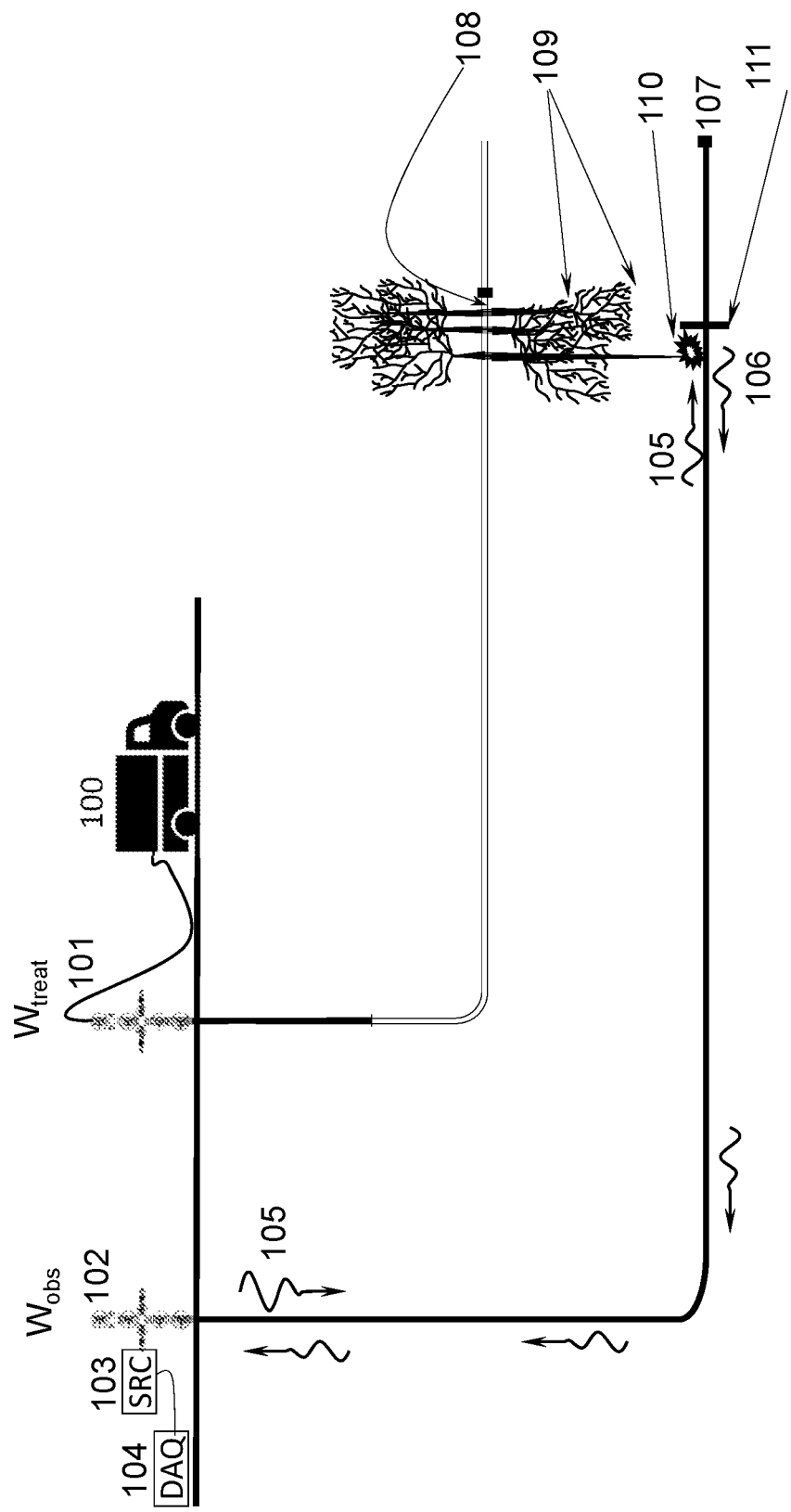

The description below uses specific examples but is not necessarily the only intended or possible implementation or use of the disclosed methods. A person having ordinary skill in the art can devise similar implementations to obtain the same results.

The present disclosure provides non-invasive ways to measure the reach and changes in stress within a formation induced by a treatment made in a treatment well (referred to herein by $W_{treat}$). Methods according to the present disclosure use measurements made in a nearby well (referred to as an "observation well"—$W_{obs}$) that penetrates the same subsurface reservoir as the treated well within the treated well ($W_{treat}$) drainage area to estimate the extent of the subsurface reservoir in which reservoir properties are affected by the treatment. The well causing changes in reservoir properties may be undergoing treatment, e.g., hydraulic fracturing, or may be an already treated and subsequently fluid producing well, it may be considered for purposes of this disclosure as "operated" on. In some embodiments, the observation well $W_{obs}$ may already have some fractures connected to and intersecting the wellbore, whether natural or induced, hydraulically connecting the observation well $W_{obs}$ to the reservoir in the vicinity of the treatment well $W_{treat}$. The properties and changes of the observation well fracture(s) are determined with respect to time as the treatment well $W_{treat}$ is being treated and as frequently as deemed appropriate (e.g., on the order of seconds during treatment, to as long as minutes or hours after treatment is stopped). The treatment well and the observation well do not need to be in direct hydraulic communication (called a "frac hit") in order to perform the measurement and thus may help avoid such frac hits where one wellbore fracture hydraulically connects with another wellbore.

Note that in the present disclosure the word "fracture" may be used in general to describe a single fracture or a fracture network. Also, in this description, a "fracture" is sometimes generalized to mean any place where hydraulic conductivity of a reservoir formation is sensitive to changes in strain; a fracture may not be the only feature used as a sensing element in an observation well in a method according to this disclosure. The wellbore itself, its changes, or another fluidic channel (e.g., perforation reaching through casing into the formation) can be used in a method according to this disclosure. Similarly, a "stress regime" can also broadly used to mean "strain."

Methods according to the present disclosure focus on indirect, but also representative measurements corresponding to change in the reservoir by determining changes in reservoir fracture width, length, conductivity, or introduction of changes to another feature hydraulically connected to the reservoir in a wellbore. Disclosed methods need not rely on a strong water hammer (e.g., caused by pump shutdown) or hydraulic connection between two wells, and measurements made in the observation well can be performed at will and at arbitrary times, changes in which may indicate stress regime change or fracture growth in the treated well. Generally speaking, fracture width and the corresponding fracture conductivity will decrease with stress and increase with internal pressure.

To implement a method according to this disclosure, a well with a fracture hydraulically connected to the subsurface reservoir is used. Such a "sensing fracture", shown at 111 in FIG. 1, is a fracture-connected wellbore and can be produced by a hydraulic fracturing treatment, or by a smaller fluid injection of known volume, sometimes referred to in the industry as a diagnostic fracture injection test, "DFIT", or "mini-frac", or may simply be an existing natural fracture connected to the observation wellbore $W_{obs}$. There may be an advantage to having more control over the "sensing fractures" in the observation well $W_{obs}$, e.g., having a tightly controlled geometry by injecting a relatively modest amount of fluid through a limited number of perforations in the well casing or liner; however such limitation is not required. Any existing fracture properties can be measured, as described in the course of implementing methods according to this disclosure, trends and changes (including rate of change) are recorded, and then may be used to determine near-fracture reservoir state, general reservoir strain and their changes. This can include behavior in complete reverse to that described above if fluid is being produced from the treatment well $W_{treat}$, such as after treatment is finished and the well is produced.

Note that a "sensing fracture" can also mean a sensitive element of the reservoir formation, which could be a porous formation with a large pore compliance. This is because conductivity of a porous medium is related to the effective hydrostatic stress (average of the three principal stresses or first stress invariant minus the pore pressure). A fracture's hydraulic conductivity is sensitive to the effective stress normal to its face. A porous medium's hydraulic conductivity is sensitive to the effective hydrostatic stress. By detecting hydraulic conductivity changes of such a sensing fracture, it is possible to detect either a change in fracture conductivity or a change in porous medium conductivity.

To arrive at a more accurate determination (less complex sensing fracture)—creating one or more sensing fractures along a wellbore drilled in the direction of the minimum stress is desirable. By monitoring changes in the geometry (preferably aperture, width, but also length or height), it is possible to effectively use the observation well $W_{obs}$ as a strain meter and thus also monitor approaching reservoir features (e.g., fractures) generating change in the observation well $W_{obs}$ nearby reservoir stress-regime. Note that inversion of the data would be easiest to interpret if the well were drilled in the direction of the minimum stress; a fracture is more sensitive to a directional stress, a porous medium is more sensitive to a mean or hydrostatic stress.

Also note, that a stress-regime change will be amplified by fracture with larger height, as contrasted with a fracture having smaller height. Thus an estimate of height can also be determined, or conversely known fracture (e.g., from passive or microseismic data) height may make the measurements more accurate.

Changes in aperture of the sensing fractures will occur when there is a net pressure change ($P_{net}=P_{frac}-S_{normal}$) in the vicinity of the sensing fracture. If $P_{frac}$ is constant, $\partial P_{net}$ will be equal to $\partial S_{normal}$, allowing calculation of stress changes, e.g., due to an approaching hydrofrac (fracture tip). Other fracture compliance relationship known in the art could be used. Also, (McClure & Kang, 2017), crack contact laws or poroelastic relationships (Barton et al. 1985 in McClure & Kang) could be applied, or aperture could be a different function of $P_{net}$ equation, $P_{net}=\alpha P_{frac}-P_{normal}$.

It has been established that pulsed pressure signals related to tube waves can be used to monitor fracture aperture (width, w, or more accurately the product of width and permeability, w*k), by detecting the change in hydraulic impedance of each fracture along the well. A method, for example as disclosed in U.S. Pat. No. 10,641,090 issued to Felkl et al., provides one way to implement such a non-invasive measurement, but other methods, including a direct in-wellbore measurement such as using downhole cameras, fiber optics, or other wellbore tools may be possible.

A small positive pressure may be maintained within the sensing fracture (inside the observation well $W_{obs}$) and monitored to determine the fracture pressure $P_{frac}$, to allow computation of net pressure:
a. Monitoring would be required because pressure in the fracture will be affected by displacements of its walls due to strain/stress changes in the surrounding medium. It can be established based on surface pressure measurements and fracture depth.

A relationship between net pressure and aperture is required, either:
a. Using model for fracture compliance (for example, using Eshelby's solution for an elliptical crack or McClure 2017, 2018 & refs. within). or,
b. Using a relationship calibrated by varying the internal wellbore pressure and monitoring the change in aperture which occurs within each sensing fracture due to that variation.

Raw measurements used in the present disclosed methods are of well fluid pressure or the time derivative of pressure of active, or quasi-active (determined by autocorrelation from noisy signal) data. Such measurements can be made by hydrophones and/or pressure transducers and signals from such devices will be recorded. Aperture changes are monitored. The aperture(s) is (are) interrogated along the well length without invasive instrumentation. Changes in aperture are converted to changes in stress regime near the wellbore. These changes can be monitored during injection, production, or shut-in on both or either the observation well and with respect to fractures originating at a nearby adjacent well. If the wells are not shut-in and are allowed to flow or are pumped to extract fluid, a correction factor may be applied to measurements from the flowing or pumped wells to account for natural fluid diffusion (in the case of a pumped well), or natural pressure decline and fracture relaxation due to the volume of produced fluid. In general, however, over a short enough time frame, these may be disregarded.

The primary result of a method according to this disclosure is the ability to detect the approach of a fracture if there is a measurable change in the hydraulic conductivity determined at a given point in the observation well, 102 ($W_{obs}$), then the approaching fracture is "close" to that well at that point. The fracture conductivity of one or more sensing fractures is monitored for changes. If sufficient additional information is available (e.g., a plot of fracture conductivity with respect to the fluid pressure in the fracture) and if the fracture conductivity is a function of the net pressure (the fluid pressure minus the normal stress perpendicular to the fracture) then a measurement of conductivity change can be used to determine the change in normal stress (after correcting for any fluid pressure change).

Once change in stress is known, the change in stress can be used to infer a combination of the position of the approaching induced fracture and its properties (e.g., extent or geometry). Having more than one sensing fracture, it is possible to fit the distribution of stress changes to invert more formally for the characteristics of the approaching fracture. This may be performed by fitting a theoretical stress (or deformation) distribution surrounding the induced fracture to the data from the sensing fractures.

Knowing how far an induced fracture has propagated is important to help the well operator avoid "frac hits" to existing wells or to nearby treated wells. It is also of benefit to be able to determine what is the effect on local stress in the subsurface formation a fracture extended by a treatment (or conversely a fracture closed due to production). It can also be used to constrain fracture shape (height, as well as length). Measuring the approach of a stress-field can enable the well operator avoid a frac hit before a direct cross-well communication becomes established.

An example embodiment of a method according to this disclosure may include a hydraulic fracturing treatment operation and data acquisition instrument system similar to what is shown in FIG. 1. The equipment used may comprise, on a well undergoing hydraulic fracturing treatment (i.e., the treatment well $W_{treat}$) 101 and the observation or analyzed well ($W_{obs}$) 102 vertical or deviated wellbore, fluid pump(s) 100, sensors (e.g., pressure transducers and hydrophone) and a pulsed pressure source SRC 103 and a signal processing unit DAQ 104, plug or wellbore bottom 107, and perforations 108. The pulsed pressure source 103 may be used to generate a pressure change to excite tube waves 105 in the analyzed wellbore 102 in order to sense the induced fracture, 109, effects on the measuring fracture (or a porous region), 111, or feature in the analyzed well 102. These effects may also be manifested by a microseismic event 110 along the observation, induced sensing fracture (often of known extent and width) 111. The "sensing fracture" 111, can be comprised of a single or several fractures. The sensing fracture 111 can also be a pre-existing, known natural fracture or a porous region to which the wellbore is connected.

Figure 2:
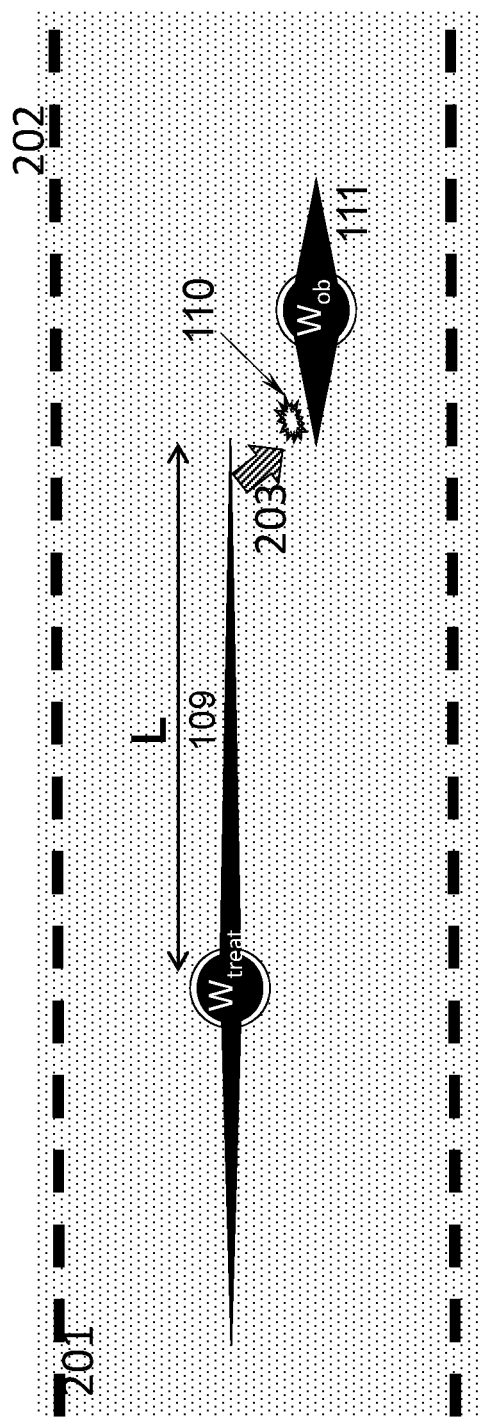
FIG. 2 shows a vertical cross-section of the 2 wells in the reservoir as in FIG. 1, and the interaction caused by extended fractures from $W_{treat}$ onto $W_{obs}$. The interaction of an approaching fracture may be above, below, or beside the sensing fracture; its effect depicted by a stress block arrow 203. Special cases of fractures connecting or interacting with a closed wellbore will be described in detail further.

FIG. 2 depicts the cross-section position of the two wells, $W_{treat}$ and $W_{obs}$ within the subsurface reservoir 201 and the boundary of the overburden stress formation 202 due to the total weight of the rocks and fluids above the depth of the subsurface reservoir 201. Some elements of FIG. 1 are also highlighted, including the induced fracture, 109, the sensing fracture, 111, the interaction, 110, and block arrow stress 203 caused by the approaching tip of the induced fracture 109.

Figure 3:
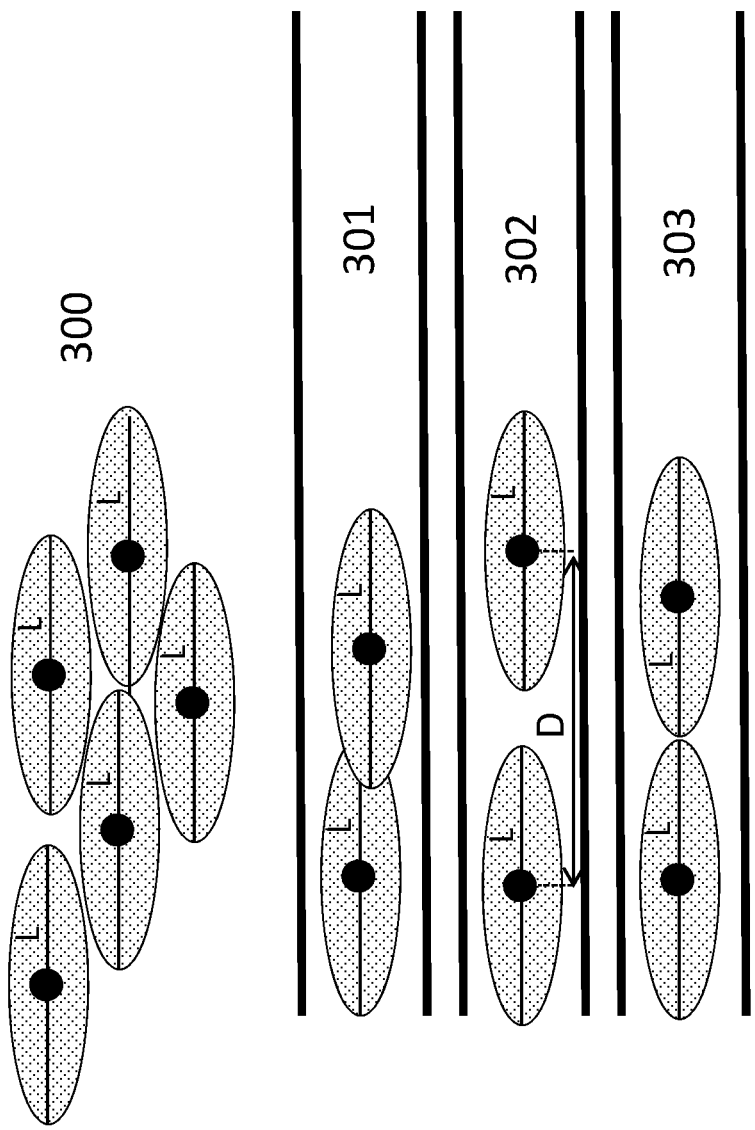
FIG. 3 shows ways an operator may choose to space wells (black circles) in a reservoir, beside, above, or below each other while paying attention to the length, keeping height "fixed" or formation height limited.
Figure 4A:
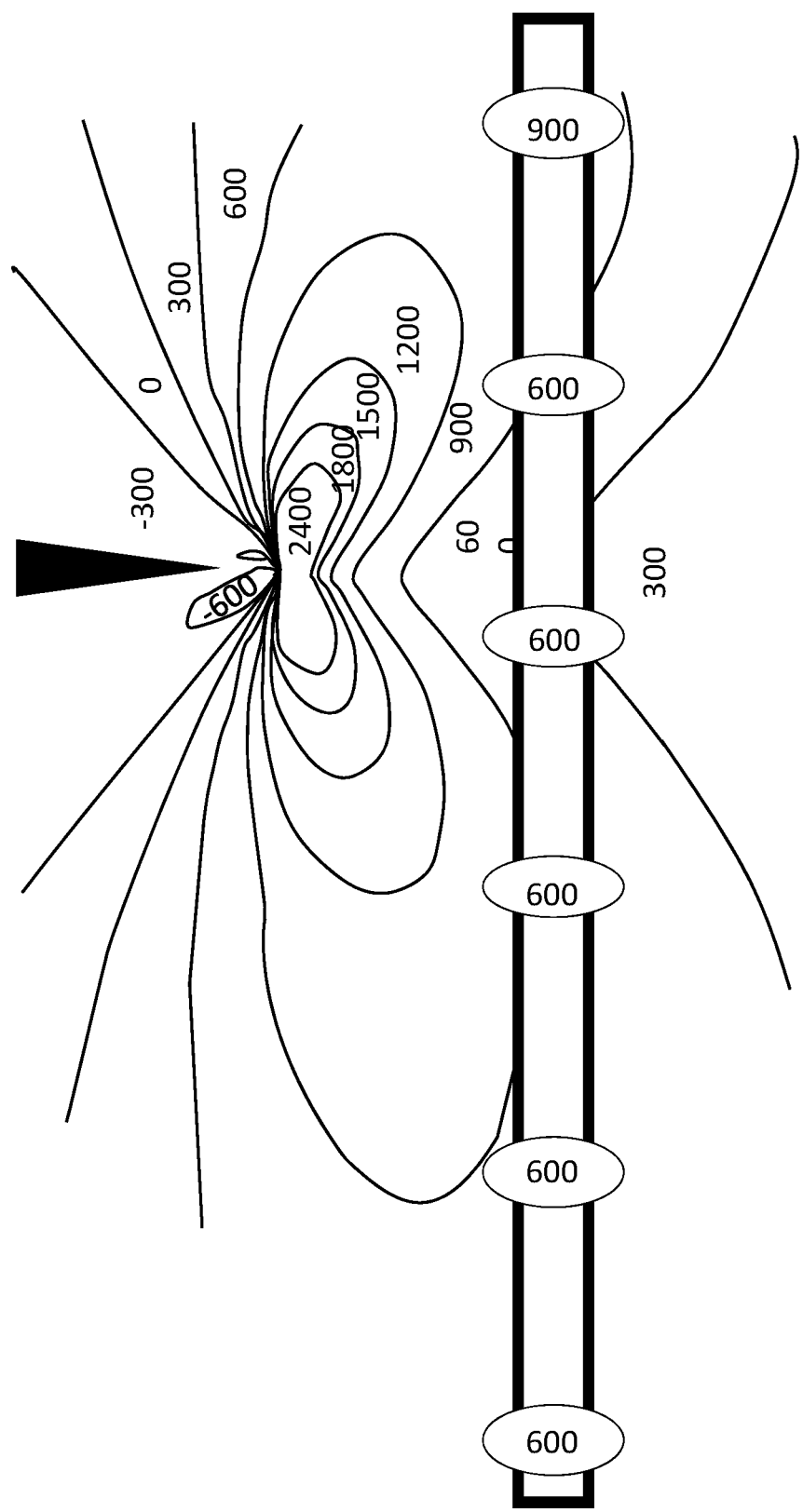
FIG. 4a shows an example stress-field near the observation wellbore with an approaching fracture far away.
Figure 4B:
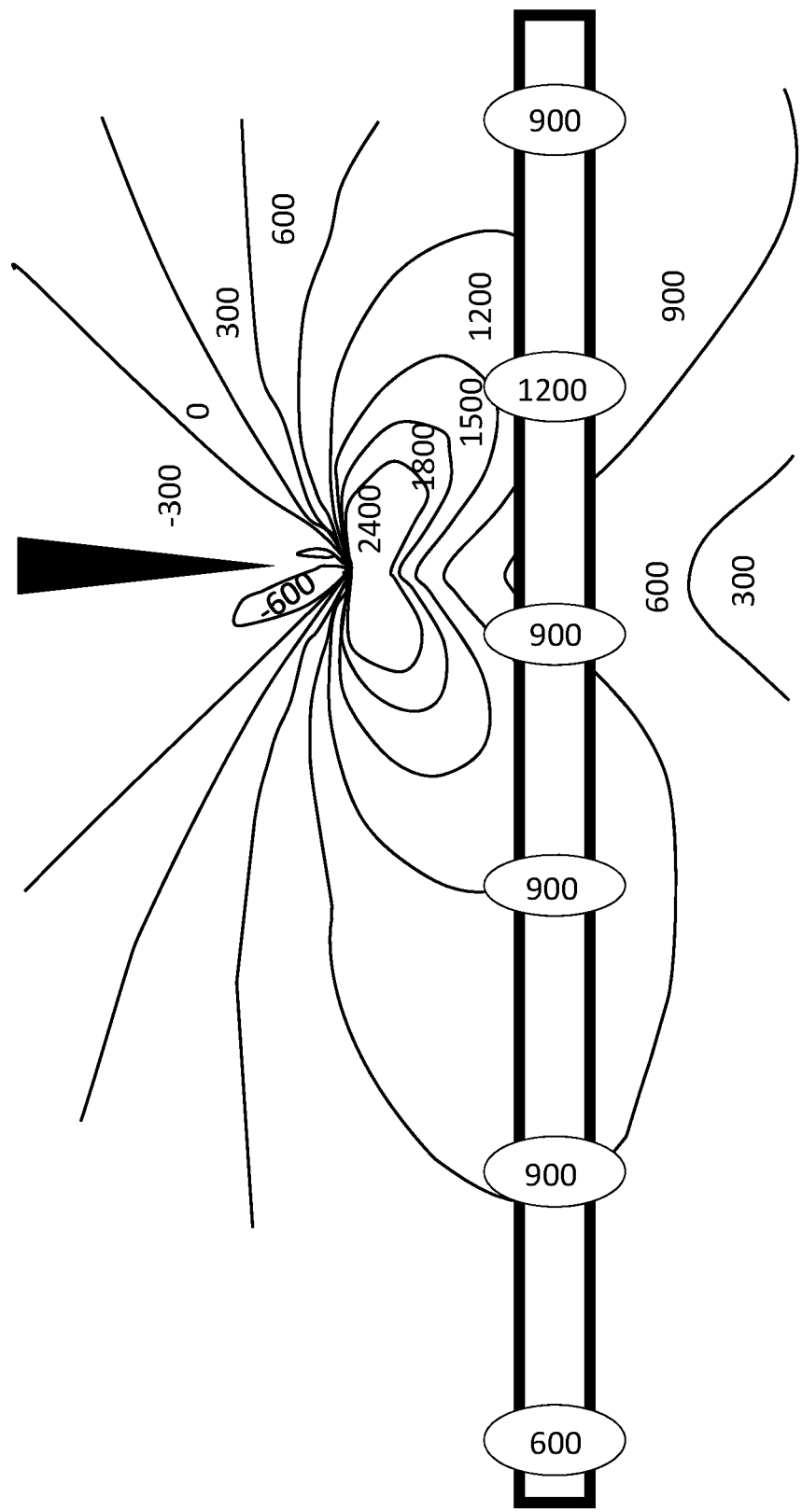
FIG. 4b shows an example stress-field reform due to the fracture growth from the treated well affecting the observer well.
Figure 4C:
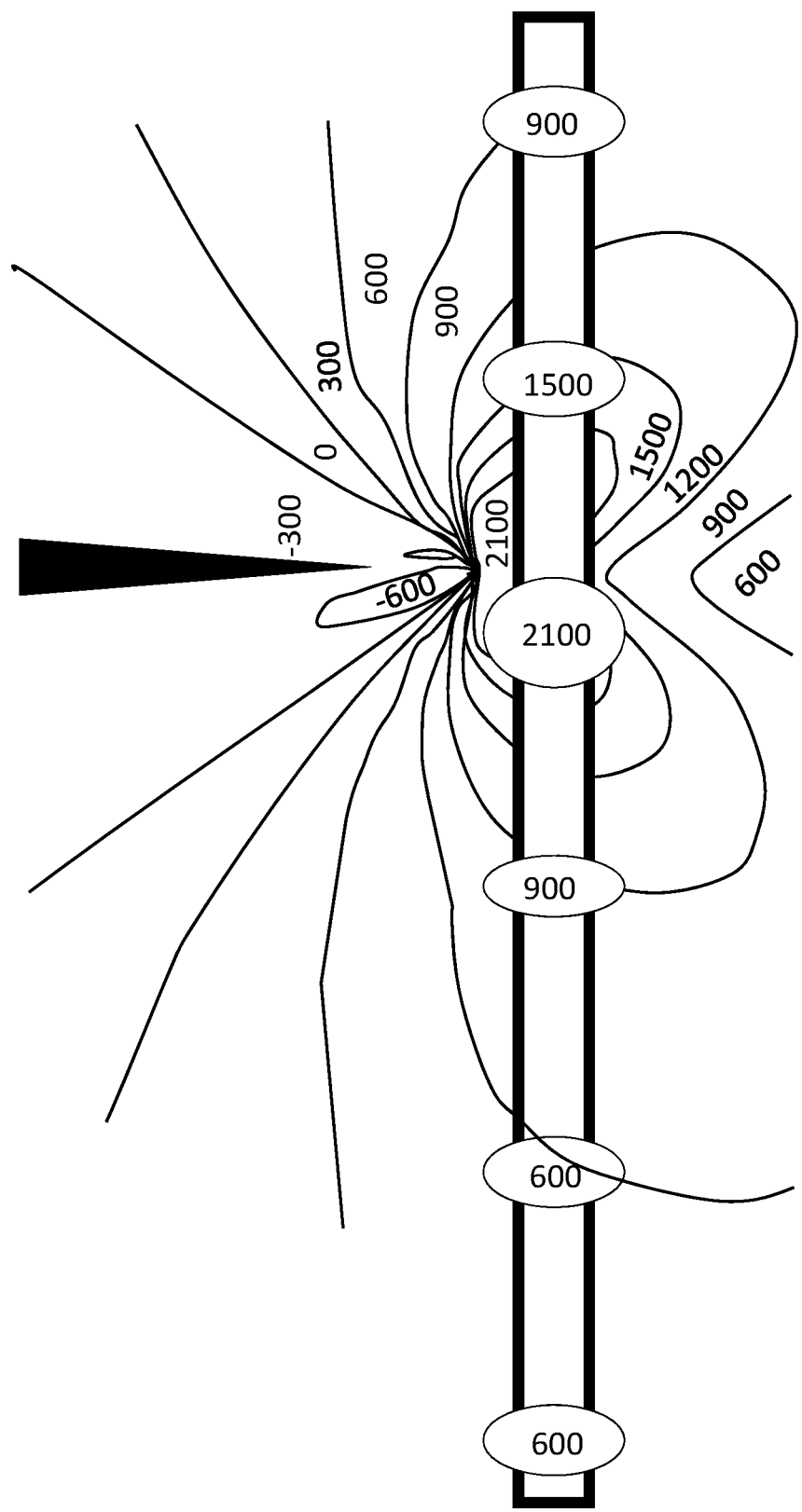
FIG. 4c shows an example stress-field changing the ratio of opening fracture ahead of the fracture in the vicinity of the observation well which could allow estimation of the distance to the fracture, or the fracture height.
Figure 4D:
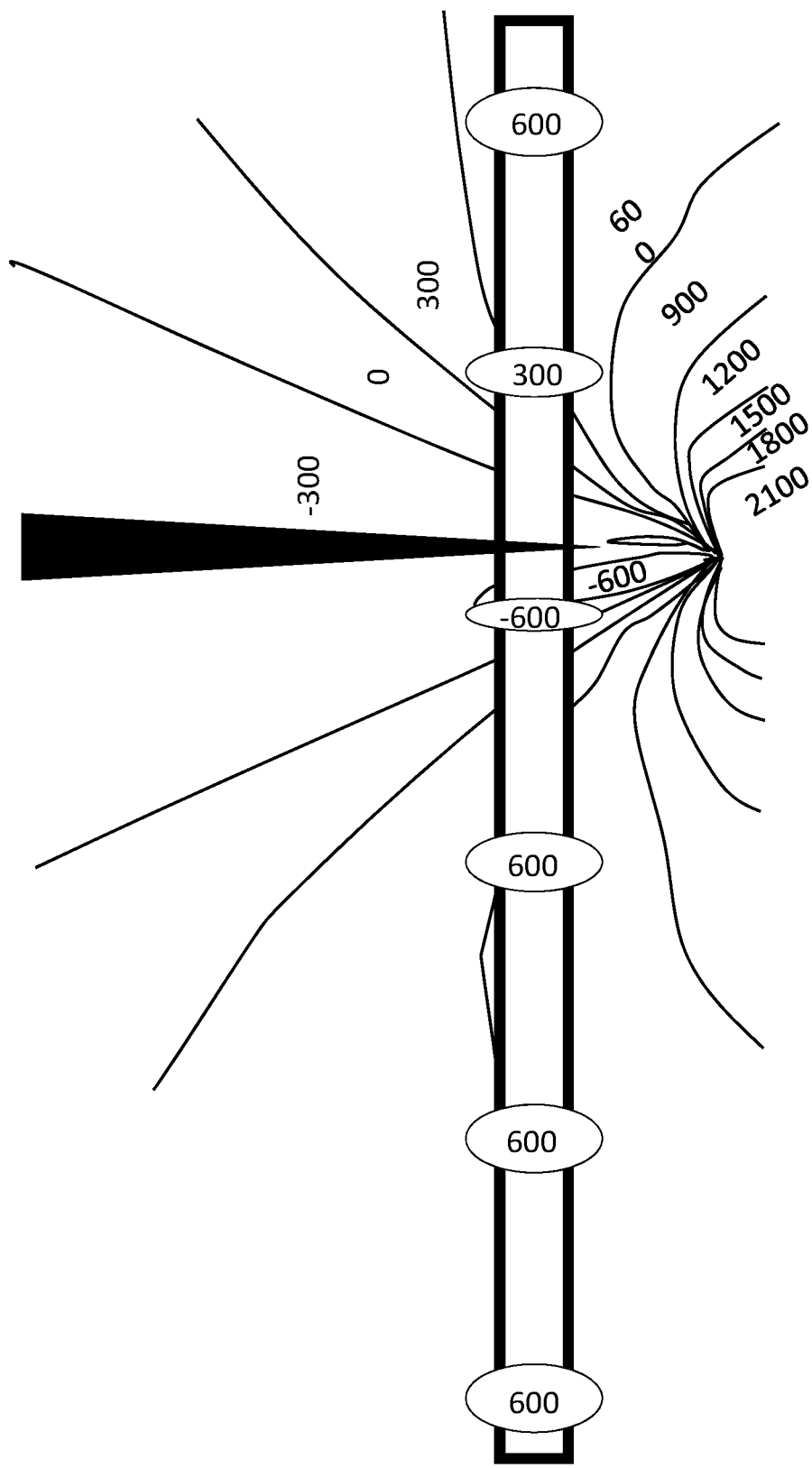
FIG. 4d shows an example stress-field near the observation wellbore with a new fracture crossing over the observation well, and closing of the fracture due to the compressional force beside the fracture.

In implementing the present example method there are at least two sufficiently close, or adjacent wellbores that penetrate the subsurface reservoir. "Sufficiently close" may be a distance to which an induced fracture from one well is likely to propagate due to a treatment. Such propagation may be preferentially in a horizontal plane, but may also be also vertical. This distance is formation-properties dependent and known in the art, but in general, would fall within roughly 100-1000 feet laterally; similarly, in a vertical direction, a proper spacing (based on layer thickness) is possible. The condition of the $W_{treat}$ and $W_{obs}$ spacing is characterized based on the comparison of induced fracture length (L) and the distance between the wellbores (D). FIG. 3 shows a cross-section view of the possible condition as overlap (D<2L) at 301, underlap (D>2L) at 302 and optimal (D~2L) at 303. The well operator may prefer the wells and their respective stimulated areas to "optimally" cover as much of reservoir as possible with minimal in-between unstimulated volume, while also not having the wells too close to overlapping. If a certain volume of a reservoir can be effectively drained with, for example, 5 wells without overlap, it would be more economical than using 6 wells with overlap, and such an arrangement of wells can generate more total fluid production than 3 wells with no overlap. An "ideal" geometric spacing of wells and roughly elliptical fractures may be as shown in FIG. 3 at 300.

Figure 5:
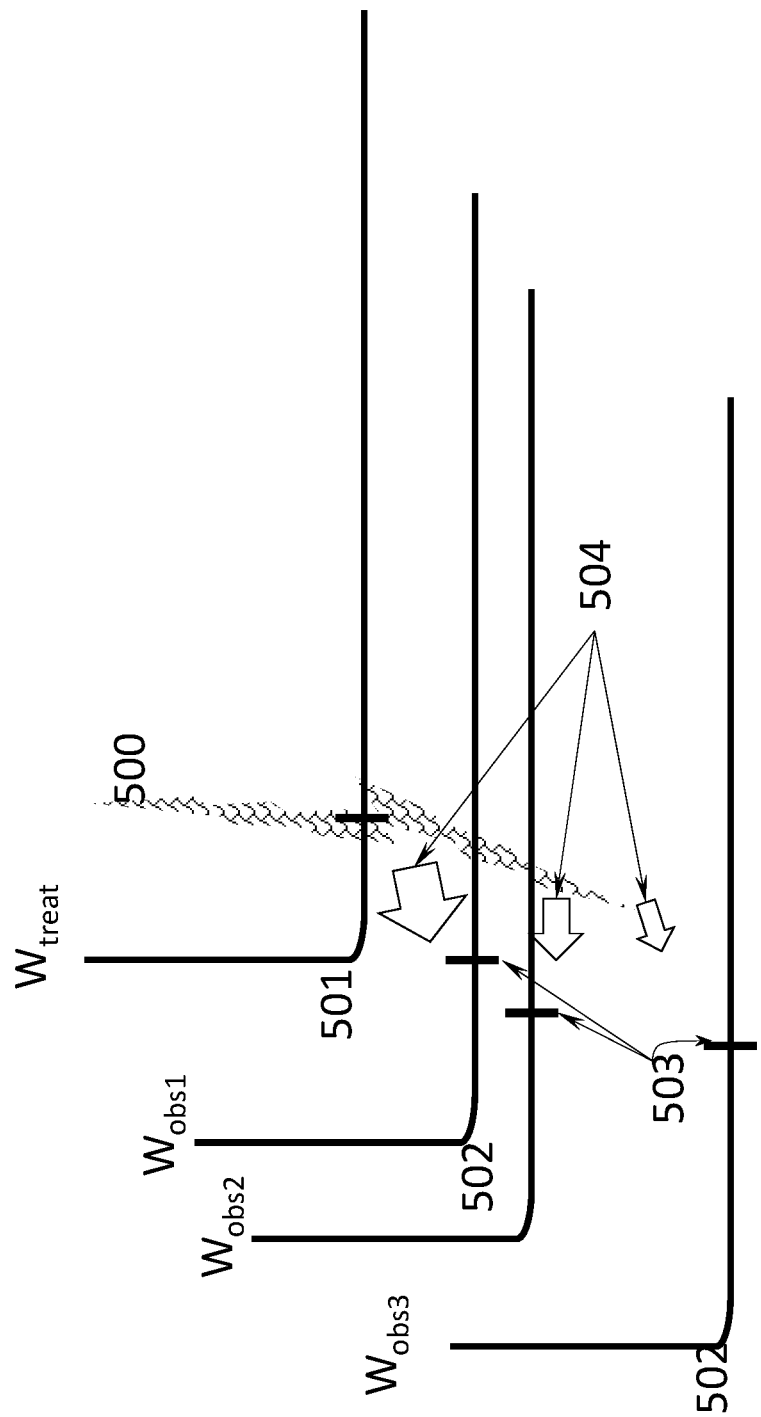
FIG. 5 shows a set of closely spaced wells and the (stress) effects caused by a fractured well nearby across several observation wells.

In some embodiments, by using multiple observation wells (and sensing fractures) in a reservoir formation, a long fracture or strain propagation can be triangulated. This is depicted in FIG. 5. Depending on the relative position of the two or more wells, a fracture, 500, may grow and cause varying deformation due to its height, length and direction in fractures connected to observation wells, 502, each having at least one observation fracture 503. The effect on each observation well is shown in the size of block arrows 504. This way, a better fracture azimuth and even growth speed can be measured (the differences given by the various strength arrows).

Figure 6:
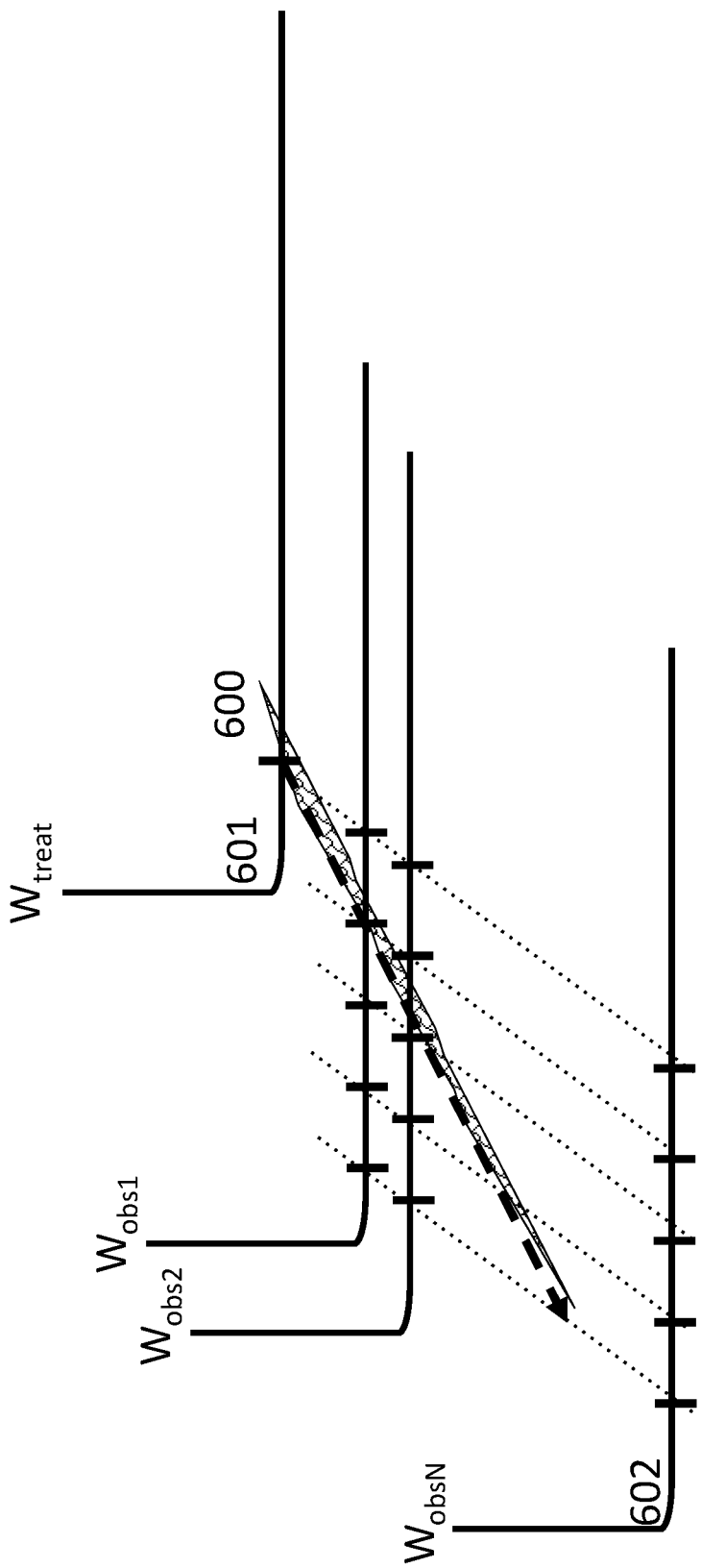
FIG. 6 shows a more general sense of a multi-well "grid" that could be used to track strain measurements and fracture propagation, 600, from well 601.

FIG. 6. shows a more general sense of a multi-well "grid" that could be used to track strain measurements and fracture propagation, 600, from well 601 across a set of observation wells with sensing fractures and known placements, 602.

Figure 9:
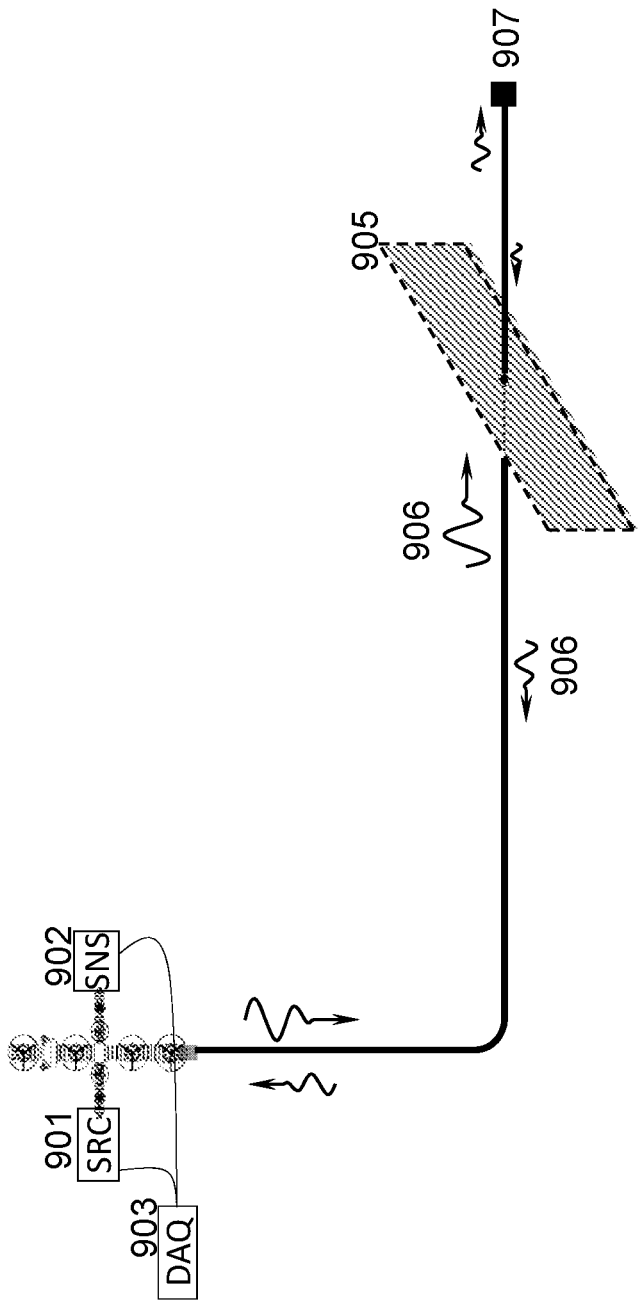
FIG. 9 shows a sensing system composed of an acoustic source, receiver(s), recording and processing unit, and a wellbore intersected by a feature, in this case a fracture.

FIG. 9 shows a measuring system as described in this disclosure, comprising an acoustic source (SRC), 901, receiver(s), 902, recording and processing unit (DAQ), 903, and a wellbore, 904, intersected by a fracture, 905. Traveling acoustic pulses regularly interrogating the fracture and its changes are depicted by wavy arrows, 906.

The following may be implemented on wells in an example embodiment of a method according to the present disclosure. The example embodiment, shown in flow chart form in FIG. 8, may be described as follows.

At 801, a "sensing fracture" is induced in using an observation well, $W_{obs}$. The observation well, $W_{obs}$ may be hydraulically treated using conventional methods, e.g., injecting fluid of a known volume to generate a fracture of reasonably known extent within the subsurface reservoir. In some embodiments, the fracture may be a naturally occurring fracture, or a prior-induced fracture of at least somewhat known properties. If the fracture is a newly induced fracture, the treatment used to induce the fracture can be a "regular" hydraulic fracturing treatment using proppant and liquid. Such treatment can comprise pumping a smaller, known amount of fluid into the observation well (similar to a diagnostic fracture injection test or "DFIT"). Such pumping may provide a more tightly controlled geometry of the sensing fracture. In particular, a pressure decay method as disclosed in International Patent Application Publication No. WO 2019/089977 filed by Tisato et al. can be used to estimate geometry of such induced fracture in the observation well.

At 802, the observation well $W_{obs}$ may be instrumented with hydrophones, pressure transducers, or similar sensors, for example, as described in U.S. Pat. No. 10,641,090 issued to Felkl et al., and for example as explained with reference to FIG. 1. Signals from the sensors are monitored and recorded. In addition, the observation well $W_{obs}$ may be instrumented with an "active source" as described in the '090 patent (e.g., a hydrophone and tube-wave 'generator'). The particular signal processing used in various embodiments according to the present disclosure is a matter of discretion for the user. A method such as disclosure in the '090 patent to obtain a fracture property can be used, or any other method, as long as the measurements made in the observation well $W_{obs}$ can be processed to obtain fracture width or other geometrical feature(s) of the sensing fracture with respect to time.

A treatment well, $W_{treat}$ may also be instrumented to include a treatment pumping apparatus used to generate fractures or strain in the reservoir formation. Note, that in case of so-called "zipper frac" procedures, both the observation well $W_{obs}$ and the treatment well $W_{treat}$ can be instrumented with both treatment pumping apparatus and active source with sensor(s). With such instrumentation and apparatus, used in zipper fracking, it is possible switch roles between the observation well and the treatment well, $W_{obs}$ and $W_{treat}$, respectively, as the wells' reservoir stages are successively treated.

In some embodiments, if the observation well $W_{obs}$ is noisy, is producing fluid, or has its sensor(s) in signal communication with processing unit capable of processing the measurements to extract resonance and pulses and thus changing sensing fracture properties in $W_{obs}$ from such noise data.

At 803, pressure pulse(s) may be induced in the observation well $W_{obs}$ at chosen times. The pressure pulse(s) should be of a type to induce tube waves in the observation well $W_{obs}$. For example, the observation well $W_{obs}$ may have pressure pulses induced and the detected signals processed to determine fracture width (or other property) every 60 seconds, or more or less frequently, depending on the measured changes and pumping rate of the treated well. Note that more frequent pressure pulses may be generated and direct pressure signals may be recorded at $W_{obs}$ once treatment starts at the treatment well $W_{treat}$ (e.g., at 106) indicating a "frac hit."

At 804, pressure measurements made in the observation well $W_{obs}$, may be inverted or otherwise processed to estimate the sensing fracture width. For example, signals may be processed to obtain the fracture property k*w as described in U.S. Pat. No. 10,641,090 issued to Felkl et al., from which a given fracture width w width can be calculated by keeping the fracture hydraulic conductivity k constant. Using other methods (e.g., fiber or flow methods, modeling), other fracture properties, such as fracture length may be determined and other geometrical properties may be used to determine change in strain or location of a disturbance (approaching fracture).

At 805, which is optional in some embodiments, for each of the actions described with reference to 801 through 804, one may use a wellbore deployed (downhole) tool, e.g., a sensor (a pressure sensor, strain gauge, fiber-optic sensor, acoustic sensor, or any similar sensor) disposed in the well at the end of a cable, wire rope, coiled tubing or other conveyance. Measurements made by the downhole tool or sensor(s) may be used to monitor changes in aperture of fracture(s) in the reservoir.

At 806, the treatment well $W_{treat}$ may be hydraulically treated so as to cause fractures in the reservoir formation to propagate from the treatment well $W_{treat}$ (e.g., in all directions of least principal stress). The fracture propagation may result in the following.

1) A fracture network extending from the treatment well $W_{treat}$ does not reach near-enough to the observation well $W_{obs}$ to have measureable effects on any existing fractures connected to the observation well $W_{obs}$, and reservoir properties determined from the measurements made in the observation well $W_{obs}$ will remain substantially constant, other than a small, consistent decrease in fracture dimension(s) associated with fluid leak off. In such event, the sensing fracture is not measurably affected. The foregoing is shown schematically in FIG. 7 in panel a. showing an undisturbed width in the observation well.

2) Some fractures from the treatment well $W_{treat}$ will extend to the proximity of the sensing fracture (and/or sensing fracture network) connected to the observation well $W_{obs}$, and may cause the local strain regime, i.e., proximate the observation well $W_{obs}$, to change. For example, there may be a perpendicular stress-decrease or a perpendicular strain-increase, and the observation well $W_{obs}$ fracture width(s) or other geometric attribute may be affected. The foregoing is shown schematically in FIG. 7 in panel b. depicting an approaching fracture with a measured small decrease in measured width, length being approximately same.

Figure 7:
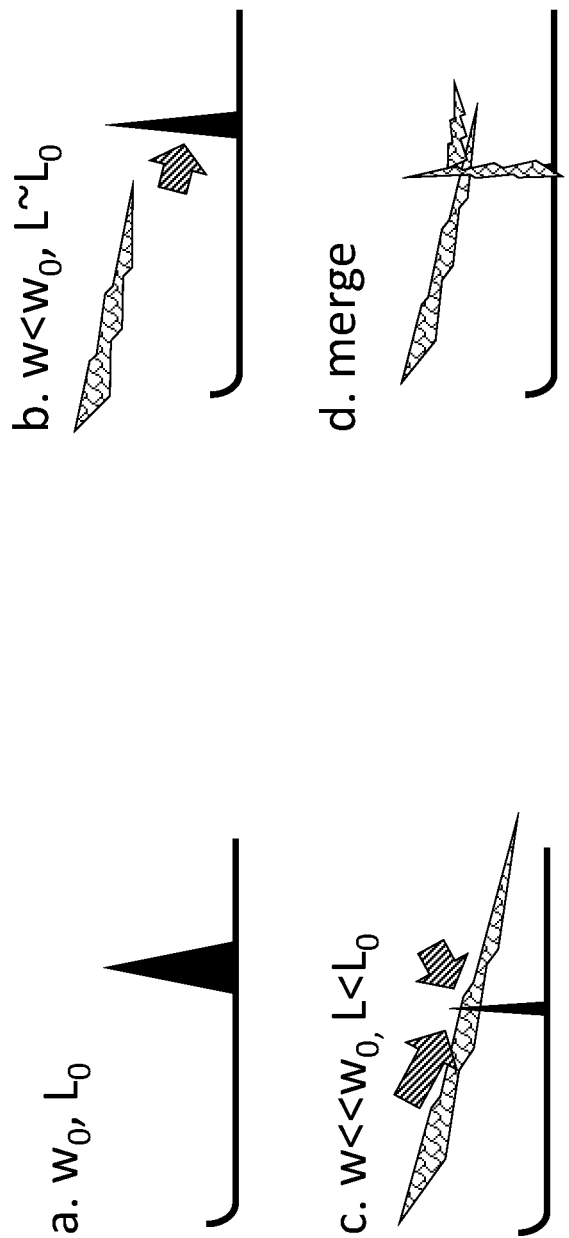
FIG. 7 shows possible changes in measured fracture widths and lengths in the observation well due to a nearby propagating fracture or reservoir strain change.

3) Some fractures from the treatment well $W_{treat}$ will intersect and extend beyond the observation well $W_{obs}$, without joining with the observation well fracture or fracture network, but will still affect local stress. The foregoing is shown in FIG. 7 in panel c. where both new measured fracture width is smaller than undisturbed case.

4) Some fractures from the treatment well $W_{treat}$ may intersect and join with the fractures or fracture network of the observation well, $W_{obs}$ causing a possible increase in pressure in the observation well $W_{obs}$ as well as substantial changes in the determined geometry attribute(s). The foregoing is shown in FIG. 7 in panel d.

Note that an impending fracture with larger height (vertical dimension in the reservoir layer) will extend a larger stress (field) on the sensing fracture than an equal fracture of lower height.

Figure 8:
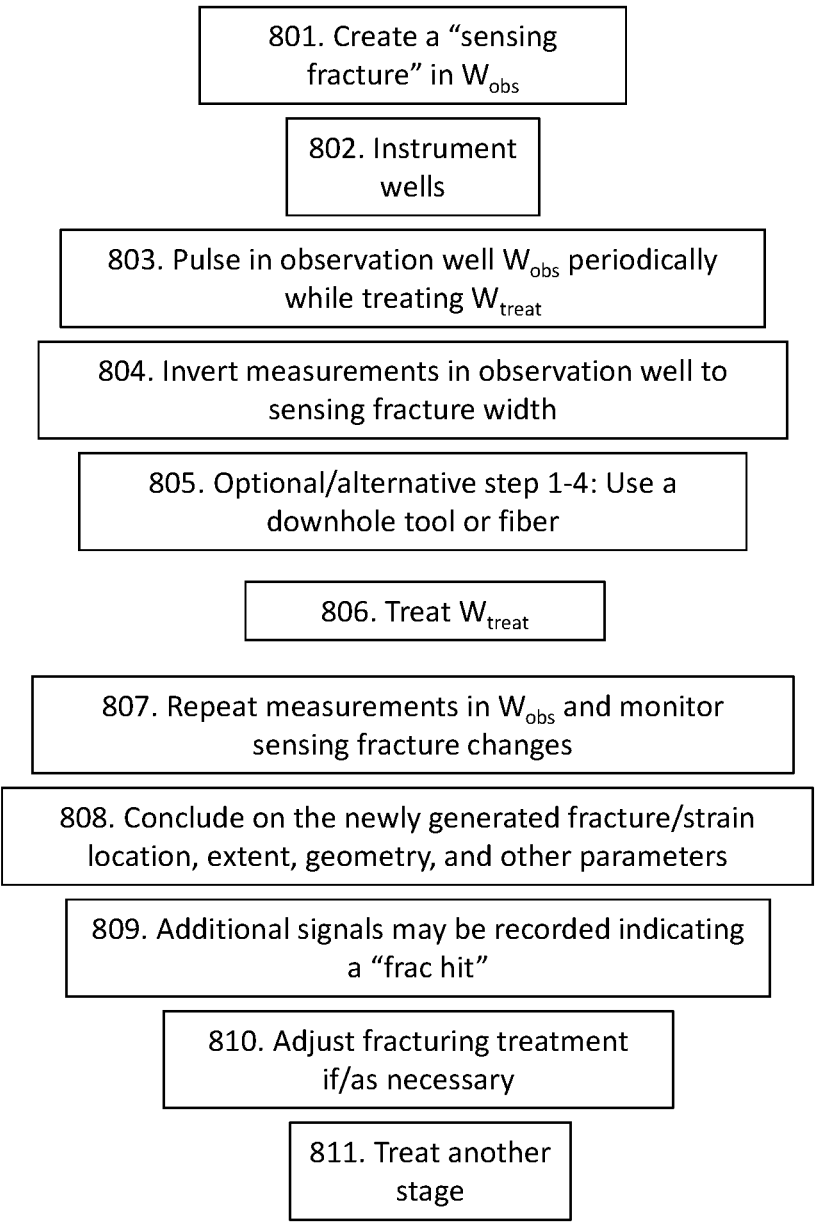
FIG. 8 shows a flowchart of implementing this method in a simple two well form.

At 807 in FIG. 8, the foregoing procedures (i.e., at 803-805) performed on the observation well $W_{obs}$ may be repeated at selected times to monitor changes in a geometric or other attribute of the sensing fracture. Irrespective of its origin, a change in stress or strain in the reservoir near the sensing fracture may be observable in the repeated determination of fracture conductivity (k*w), where a change in fracture width (or permeability) can be inferred; additional geometric attributes or fracture properties sensitive to fracture width or stress, such as fracture length, may also be affected. A possible cause of change in the sensing fracture may be newly created nearby fractures extending from the treatment well $W_{treat}$. The process described above with reference to FIG. 8 is dynamic. A series of such sensing fracture property determinations with respect to time as per FIG. 7 may enable identifying progression of fractures nearing the observation well $W_{obs}$, approaching as in FIG. 7 in panel b, passing by the observation well $W_{obs}$ at (c), and extending beyond the observation well $W_{obs}$, or merging with the existing fracture network in panel d, i.e., direct frac hits.

At 808, the process may conclude using the newly generated fracture/strain location, extent, geometry, and other parameters based on the measurements made as described in the observation well $W_{obs}$, some conclusions related to progression and location, and extent or geometry of fractures induced by pumping into the treatment well $W_{treat}$ as shown in FIG. 7 in panels a through d can be made about the extent ("fracture length") of fracture(s) generated by pumping a treatment into the treatment well $W_{treat}$.

At 809, additional signals may be recorded and processed to indicate a "frac hit." Throughout the treatment, microseismic or other acoustic events in the reservoir formation may generate a strong or measurable tube wave signal emanating from the sensing fracture into the observation well $W_{obs}$. Such signal may be detected with instruments, such as sensitive hydrophones, pressure transducers, or fiber optic cable(s) in the observation well $W_{obs}$, or acoustic sensor(s) deployed on the surface. Such an event may be considered a "frac hit", or a near "frac hit" and would be noted by the user, indicating an approach of the fracture propagating from the treatment well $W_{treat}$. The well operator may then chose to pump diverters or may slow the treatment pumping rate into the treatment well to mitigate any cross-well interaction.

At 810, treatment parameters may be adjusted in response to determined changes in the sensing fracture accordingly, A skilled operator will generally adjust treatments performed in the treatment well $W_{treat}$, and any relevant subsequent treatment designs to optimize for desired fracture properties (such as dimension, e.g., length) in the treatment $W_{treat}$ or any subsequent wells drilled through the reservoir formation.

At 811, another fracture treatment stage may be performed after placing a bridge plug in the treatment well $W_{treat}$. This will generate new fractures emanating from the new stage of the treatment well $W_{treat}$. If "zipper frac" treatment operations are performed in more than one nearby well, an observation well $W_{obs}$ may be used as a treatment $W_{treat}$ and vice versa for purposes of performing the disclosed method.

On a generally longer time scale, one can use the system of FIG. 9 also to monitor fracture (and thus reservoir) properties (e.g., decrease in reservoir stresses) when a well (or a plurality of wells) is on production and reservoir pressure decreases over time. The fractures then can be expected to slowly close to the extent the proppant particles allow, or relax. Conversely, if there is a fluid injection into a reservoir, it will be apparent and measurable in sufficiently nearby fractures connected to the observation well $W_{obs}$ and reservoir stress increases due to injection can be monitored over time.

In some embodiments, the procedure can be performed in a single well by using isolation packers or a coiled tubing to treat a portion of the well, while using another isolated portion of the wellbore connected with a fracture to monitor the treatment progress and subsequent sensing fracture changes.

Another example of a practical implementation of methods according to this disclosure is in a zipper-frac treatment that includes two (or more) nearby wells treated in tandem. Using a method according to the present disclosure on such tandem treated wells, it may be possible to optimize stresses (including stress-shadowing) between the wells and obtain a desired fracture network geometry to optimize fluid production from the reservoir formation (such as the close-pack of wells and stages as in 300 top of FIG. 3. In this case, once a treatment well $W_{treat}$ has been treated and its associated fracture length estimated, an observation $W_{obs}$ may be subsequently treated and for purposes of the method act as the treatment well $W_{treat}$. The treatment well in the prior completed treatment then may act as the observation well $W_{obs}$, as stages in the treatment progress. Having the benefit of stress related information determined as explained herein, e.g., the stress regimes, fracture geometric attributes and effects of stress shadowing, the fracture treatment or well operator may be able to adjust subsequent fracture treatment parameters, e.g., pumping rate, proppant concentration, proppant mineral composition, proppant grain size distribution, fluid rheological properties, or perforation schema, spacing, and stage lengths. Such adjustments may be performed to obtain desired treatment characteristics by modifying for example stage spacing, pump design (fluid quantity, proppant type and amount, perforation design, etc.).

In another embodiment of a method according to the present disclosure, a single, fluid producing well (or a similar combination of well pairs) can be analyzed as follows.

1. The "treatment well" $W_{treat}$ is being produced (operated) and is instrumented with the sensors and equipment as described above with reference to FIG. 1.
2. The treatment well $W_{treat}$ is interrogated as explained above with reference to the observation well $W_{obs}$, at intervals as desired or necessary to determine changes in reflection coefficient that translate to changes in k*w of the fractures hydraulically connected to the treatment well $W_{treat}$.
3. Changes in the determined fracture width are translated to a reduction in the stress of the region being produced.
4. The changes in 3 above may be monitored and correlated to production from at least one well over time.

In another embodiment, a stress regime in a part of a reservoir formation that is being produced can be estimated by observing determined fracture width decrease over time. Such information may, for example, be used to inform reservoir fluid production and fracture network models.

Thus by creating one or more sensing fractures along a wellbore drilled in the direction of the minimum stress, and by monitoring changes in the aperture of such sensing fracture(s), it is possible to use a well as a strain meter. If multiple fractures are opened by any particular treatment, the fractures that approach the observation well $W_{obs}$ can be identified and measured, and thus constrain and indicate unobserved attributes of that fracture, such as direction, or height.

The use of a natural fracture as a sensing fracture is possible, because such fractures can be located (depth-wise) based on tube-wave reflections from the fracture mouth. To help with localizing sensing fractures in a wellbore, known reflectors (for example discs, or partial plugs) can be placed at predetermined depths in the well. Often, during hydraulic fracturing, bridge plugs are deployed in the well tubular to separate stages, and perforations may be located only within a relatively narrow region of the well; both the plug and perforations then represent well-known reflector locations, as well as an extreme-most location of a sensing fracture. In some cases, a perforation itself, if deep enough or if connected to an existing natural fracture, may be able to serve as a "sensing fracture."

Computer simulations on stress in the reservoir, stress shadow due to existing or recently completed fracture, poroelasticity, and other effects can be taken into account when making the treatment adjustments and treatments. Fracture models can, especially when combined with known properties, show the 3D orientation and extent of a propagating fracture, when more than one sensing fracture and more than one observation well $W_{obs}$ are used.

Changes in aperture of the sensing fractures will occur when there is a net pressure change ($P_{net}=P_{frac}-S_{normal}$) in the vicinity of the fracture. If $P_{frac}$ is constant, $DP_{net}$ will be equal to $DS_{normal}$, allowing calculation of stress changes, e.g., due to an approaching hydrofrac.

Pulsed pressure signals can be used to monitor fracture aperture, as explained above, by detecting change in hydraulic impedance of each fracture along the well. Fracture aperture changes (width) are monitored; pressure changes may be used to invert the aperture changes. The apertures are interrogated along the well length without invasive instrumentation. Changes in aperture are converted to changes in stress regime near the well. These changes can be monitored during injection, production on both the observation well, 102, as well as with respect to fractures originating at a nearby adjacent well, 101. Possible features and benefits include the following:

1. Aperture changes are monitored; pressure changes (e.g., hydrophone signals) may be used to invert the aperture changes.
2. It is possible to monitor approach of a deformation front in a reservoir from a well.
3. A method according to this disclosure can be used to determine distance from a "sensor line" using multiple wells, and/or multiple fractures—"sensor line of fracture".

The benefit of a method according to the current disclosure over other forms of cross-well interaction measurements is that nothing needs to be installed inside the well; sources and sensors can be at or near the surface. Additionally, this indirect measurement does not require a hydraulic connection between the observation well and the treatment well.

Adding a numerical model (e.g., ResFrac) to invert the offset as one fracture approaches a first well, conductivity of the measurement well changes, can create a series of snapshots/movie from the change, effectively a 3D time lapse image of fracture propagation. Note that a conductivity of a sand-filled slot with stationary sand and a fluid flow is defined as kw (direct relationship). In some cases, a fracture with the same sand can be approximated as a parallel plate and the conductivity, would be $w^3/12$, thus "kw" is related to the cube of the fracture width. In a sand-filled (propped) fracture, the conductivity itself is related to width, $kw \propto w^3/12$ for a. The extent on stress change opening fracture distance it extends from fracture is a function of a shortest extent of the fracture. The taller the fracture, the more stress is transferred away from it. Distance of deformation extent is function of the height of the fracture.

The measurement is sensitive for height—large height fractures have deformations stress fields that extend farther than lower height fractures. If it is known that a fracture is 100 feet away from a sensing fracture, a 1000 foot height fracture, will indicate a larger stress change response than a 100 foot height fracture. Larger deformation extent implies large height fracture, otherwise the fracture is relatively lower height. Thus a height to length (H/L) aspect ratio can be estimated. It may be possible to constrain fracture height if it is possible to determine stress at various distances from the measuring line of sensors (as shown in FIG. 6) formed by a series of fractures connected to at least one wellbore. The sensor line may be in the form of one or more subsurface fractures that have their widths periodically measured.

Tidal forces can change strain in subsurface reservoirs and enclosed bodies in the subsurface. Holding everything else constant, the disclosed method could also be used to measure tidally-induced changes in a fracture or a reservoir.

Calibrating the sensing fracture is optional and not required as only changes from a baseline can be measured. However, one way to calibrate would be to exploit the changes in reservoir or sensing fractures using predictable tidal strains (due to Moon and Sun's gravity force) and their regular changes. These changes will tend to flatten and lengthen the reservoir-fracture system based on orientation. Additional method is mentioned by way of example using pressure decay in the '977 patent Application Publication cited above.

Generally speaking, the "fracture" in this disclosure can be also defined as a porous medium w/ pressure-sensitive conductivity). Any change in conductivity or property related to width can be measured using this method. In addition, the wells used ($W_{obs}$, $W_{treat}$) can be in different planes or nearby formations. Even though fractures tend to propagate horizontally—they may not always do so, and knowing that a treatment has left the intended zone is valuable and provides opportunities to mitigate the ongoing treatment.

Diverter can be used to control operations/positioning of existing or future fractures based on real time data from $W_{obs}$, e.g. when a fracture grows too close from $W_{treat}$ to $W_{obs}$, operator may choose to pump diverters to temporarily block of the extension of existing fractures in favor of opening or extending other fracture systems. Invention can be applied anywhere where extent of fracture system should be known.

Although described for a two-well system, the present method can be applied to a single well as follows: One would monitor a fracture within a same well, provided this single fracture and its measurements can be isolated from the portion of the wellbore itself being fractured. There are tools and methods known in the art to perform such isolation and measurements, for example using the annulus, coiled tubing measurements, sliding sleeve isolation, or straddle packers, among other examples.

Installing tube wave reflectors at known locations along the well may enable determining localized changes in the conductivity of the sensing fracture.

It is noted, that if a sensing fracture is embodied as a plurality of fractures distributed along the wellbore, a fiber-optic or other distributed sensor arrangement may be used in conjunction with the present disclosure to pinpoint the exact fracture(s) at which the dominant strain or change in width takes place, thus further helping locate the approaching fracture (tip). Note that fracture width is related to effective (or net) pressure, $P_{net}$. There are other ways to do the same as according to the present disclosure beside direct detection, i.e., using differences (time changes of the signals, rather than the signals themselves) and taking advantage of reflectors placed in an offset (nearby) well at known locations. This would be a way to have an "interferometer" analogous to a fiber optic measurement.

What the disclosure suggests is the same in principle—computing a change in hydraulic conductivity at one or more points along one or more wellbores, from which one can infer one or more strains (for fractures they are uniaxial strains or changes in length in the dimension perpendicular to the fracture; for a permeable medium they are dilatational or volumetric strains). invention method according to this disclosure uses simulations to fit the measured strain(s) to what would be expected for a fracture. One can constrain some things about the fracture to limit the parameter space—i.e., it had to start from a known injection point or points and based on basic propagation principles one knows approximately its orientation.

Note that a fiber optic installation itself could be used as a strain meter: Fiber may wrapped helically around the well casing or liner before it is cemented in place. The optical fiber deforms as formation stress change occurs. Laser pulses are scattered by diffraction gratings in the optical fiber and fiber length changes are detectable using interferometry and known optical fiber interrogation techniques. An inversion from the distance allows position and magnitude of deformation to be mapped.

Extensions to methods according to this disclosure may comprise the following:
  i. Install an optical fiber in a well to measure pressure or acoustic pulse propagation along the well and to monitor changes in the fluid exchange between each fracture and the wellbore; exploit fiber to detect thermal, pressure, and other features of "frac hits."
  ii. Calibrate or exploit using tidal strains and their regular changes. Install reflectors along the well to allow accurate location of induced changes due to subtle effects e.g. tube wave velocity changes
  iii. Combine with far-field pressure decay e.g., as disclosed in International Application Publication No. WO 2019/089977 to constrain both results' geometry.

Combination of Pressure and Object Property Measurements while Operating

Starting with two wells, an observation well $W_{obs}$ and a fracture treated well, $W_{treat}$, the observation well $W_{obs}$ has an existing fracture in hydraulic communication with the well, hereinafter referred to as a "sensing fracture" and the width of the sensing fracture can be measured (the width referred to as $w_{sense}$) using a method as disclosed in the '090 patent. Pressure in the observation well $W_{obs}$ is also measured. $W_{treat}$ is about to be treated by hydraulic fracturing.

During a procedure according to the present disclosure, $W_{obs}$ may be instrumented as explained with reference to FIG. 1. Once so instrumented, begin recording pressure, $P_{obs}$, on the observation well $W_{obs}$. Periodically, pulse the source in the observation well to generate tube waves in the observation well $W_{obs}$ and process detected reflected tube wave signals to determine the sensing fracture width $w_{sense}$. There may be a small decay (decrease) in both $w_{sense}$ and $P_{obs}$ values as the sensing fracture relaxes over time (depending on the time since the sensing fracture was created). Such small decay in pressure and fracture width may be considered part of a normal trend of well pressure and sensing fracture width in the observation well. During operations on the treatment well $W_{treat}$, it is desirable to continually monitor for changes in $P_{obs}$ and $w_{sense}$.

Start fracture treatment on the treatment well $W_{treat}$. The growing fractures from the treatment well $W_{treat}$ may eventually interact with the observation well $W_{obs}$ (sensing) fracture if the treatment well fractures and the sensing fracture get close enough. There are four base scenarios (and combinations thereof) that can be measured and interpreted based on observation well pressure $P_{obs}$ and sensing fracture width $w_{sense}$ changes:

1. $P_{obs}$ and $w_{sense}$ continue to slowly decay or remain constant is indicative of No interaction between the sensing fracture in the observation well and the fractures in the treatment well $W_{treat}$. In this case the fractures in the treatment well are too far from the observation well $W_{obs}$ sensing fracture.
2. Both the observation well pressure $P_{obs}$ and the sensing fracture width $w_{sense}$ increase to a relatively large value, and then stabilize. Such behavior is indicative of the fractures in the treatment well being connected to the sensing fracture in the observation well. The pressure at which the treatment well fractures and the sensing fracture in the observation well are connected can also be interpreted as fracture propagation pressure.

3. The sensing fracture width $w_{sense}$ increases, and pressure in the observation well $P_{obs}$ decreases, and then stabilizes. Such behavior is indicative of only the fracture tips interacting between the treatment well fractures and the sensing fracture.

4. The pressure in the observation well $P_{obs}$ increases (less strongly than in the first scenario above), and the sensing fracture width $w_{sense}$ decreases. Such behavior is indicative of the fractures in the treatment well bypassing the sensing fracture in the observation well (i.e., next to each other). A sustained $P_{obs}$ increase and $w_{sense}$ changes indicate further bypass.

In any of the foregoing scenarios, the well operator may be alerted, and the well operator may modify the fracture treatment parameters on the treatment well $W_{treat}$ to avoid pumping fluid into the observation well $W_{obs}$. The foregoing procedure may be repeated as needed.

Using combined observation well pressure measurements and observation well fracture property changes, it is then possible to determine the type of cross-well fracture interaction as follows. Three types of interaction can be described with reference to FIG. 11 in graphs a through ca-c. and corresponding $P_{obs}$ and $w_{sense}$ graphs in FIG. 12.

Figure 11:
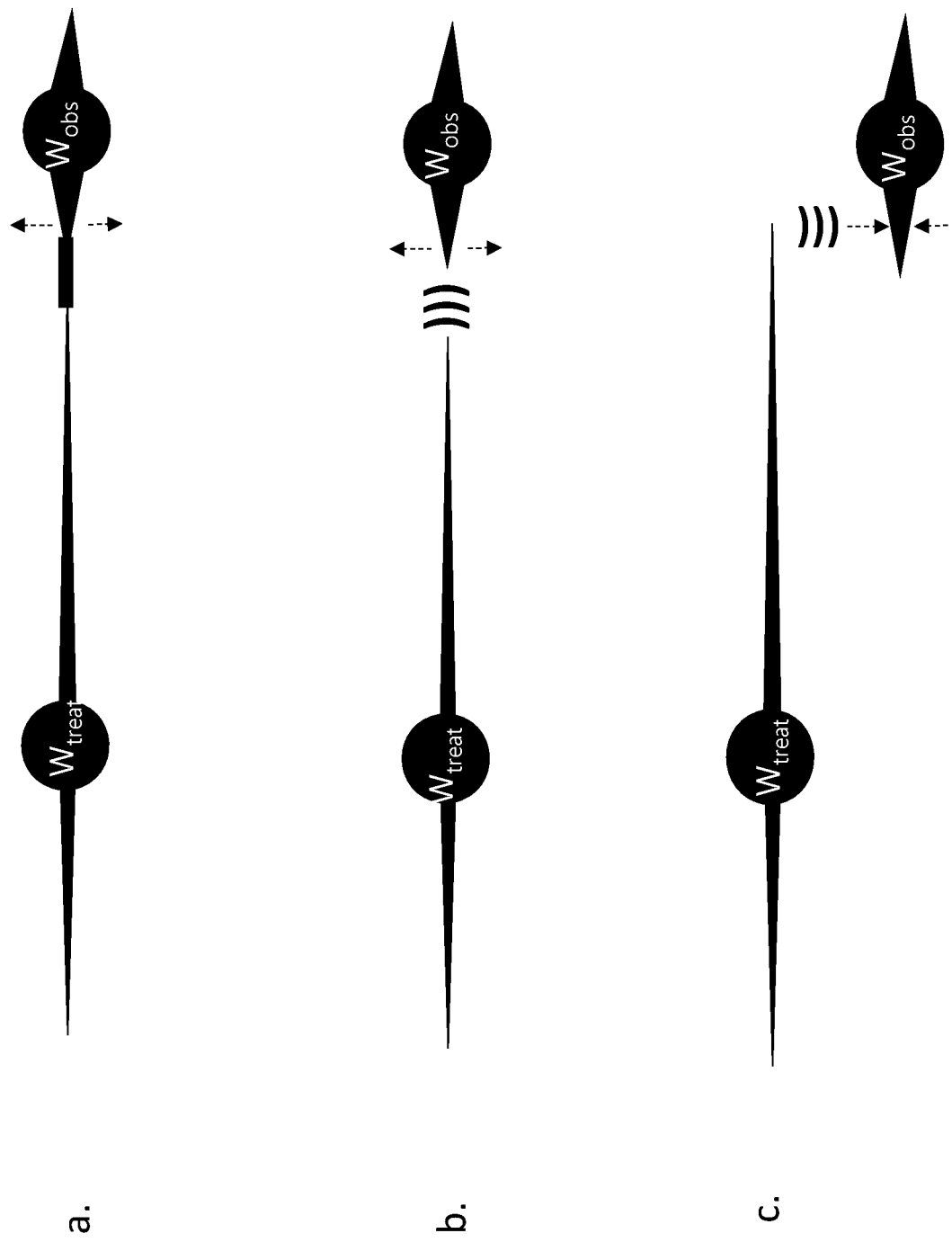
FIG. 11 shows three example types of a possible interaction and positioning between two wells' fractures.
Figure 12:
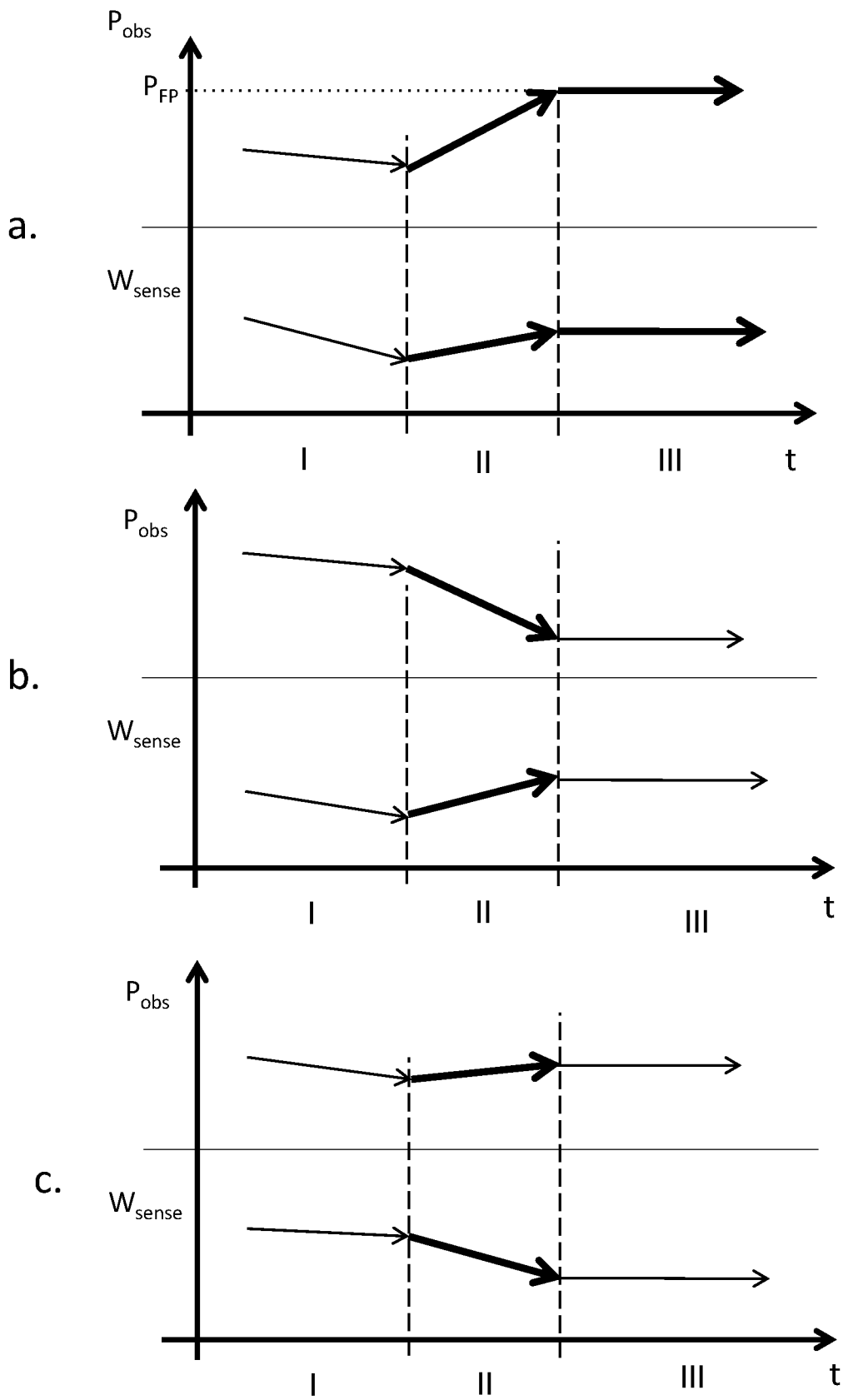
FIG. 12 shows graphs of pressure in an observation well and determined fracture width with respect to time for various types of fracture interactions.
Figure 12:
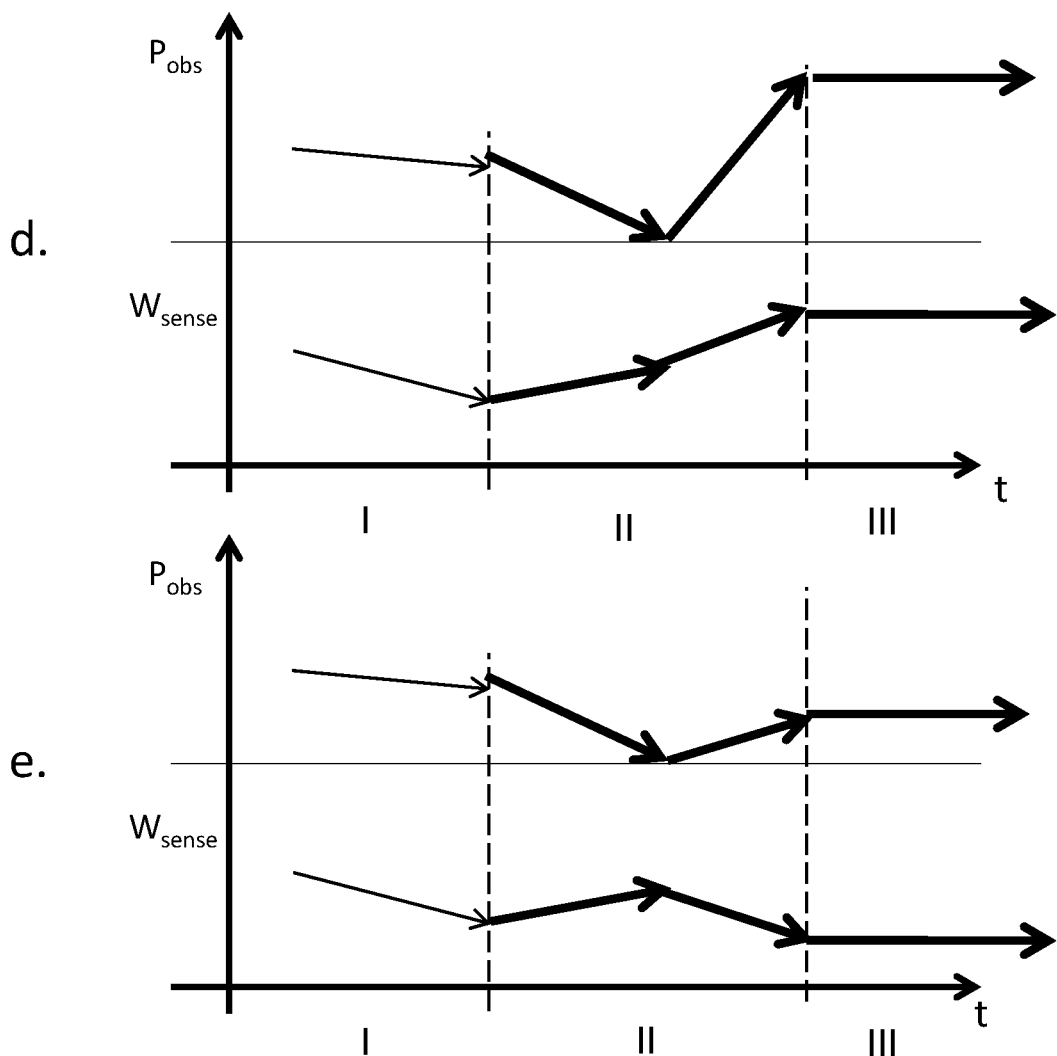

In FIG. 11, panel a and FIG. 12 graph a, a direct connection was created between fractures in the treatment well $W_{treat}$ and the sensing fracture in the observation well $W_{obs}$.

In FIG. 11 graph b and at graph b in FIG. 12, tip to tip fracture interactions take place, wherein tips of the treatment well fractures approach close enough to the $W_{obs}$ sensing fracture so that the fractures hydraulically affect each other.

In FIG. 11, graph c and FIG. 12 graph c, fracture bypass takes place, that is, expanding fractures from the treatment well $W_{treat}$ bypass (no hydraulic connection) close enough to the sensing fracture in the observation well $W_{obs}$ to interact only indirectly through the stress field around the treatment well fractures (stress shadow). Dashed arrows in FIG. 11 show stress forces opening or closing the sensing fracture in the observation well.

FIG. 12 shows graphs of the pressure and fracture width (in arbitrary units) that may be observed over time as a fracture originating from the treatment well $W_{treat}$ approaches the observation well $W_{obs}$. All graphs in FIG. 12 have three distinct time regions: prior to fracture interaction, at I, during fracture interaction, at II, and after fracture interaction reaches a steady state, at III. The regions of particular interest are II, where the interaction is occurring and the type of interaction is determined based on the combination of changes (increase/decrease) of sensing fracture width $w_{sense}$ and observation well pressure $P_{obs}$.

A flow chart of another example method according to the present disclosure will be explained with reference to FIG. 10. At 1010, two wells may be arranged as explained with reference to FIG. 1. An observation well $W_{obs}$, may be instrumented with a hydrophone or a pressure transducer, and an acoustic source that can induce tube-waves in the observation well. The observation well $W_{obs}$ may include a recently created fracture (sensing fracture) that is hydraulically connected to the reservoir as shown in FIG. 1. Such a fracture would naturally experience a relaxation with corresponding measureable pressure decrease (decay) after creation of the fracture. The observation well $W_{obs}$ is shut-in, that is, closed to flow at the surface, and thus there is no flow into or out of the observation well at the surface. The only hydraulic connection to the observation well is therefore between the observation well and the subsurface reservoir through the sensing fracture that connects to the observation well (e.g., through perforations when the observation well has a casing or liner). A nearby treated well, $W_{treat}$ will undergo hydraulic fracturing treatment.

At 1020, pressure in the observation well $W_{obs}$, $P_{obs}$, is measured and recorded. This pressure may exhibit a decaying trend due to a slow closure or relaxation of the sensing fracture. Periodically, the acoustic source is operated to generate tube waves in the observation well, and the transient (that is, having no effect on the longer-term measured pressure changes) tube wave reflections are measured and recorded for processing. It should be noted that it is possible to measure both pressure in the observation well and tube wave induced events in the observation well using a single pressure sensor, however the specific instrumentation used to make the foregoing measurements is not a limitation on the scope of the present disclosure.

At 1030, the tube-wave reflections measured at 1020 can be related (e.g., inverted) to obtain sensing fracture properties, such as a kw/μ product of permeability and fracture width over viscosity as described in the '090 patent. The foregoing can be referred to as "near-field conductivity index" (NFCI), or, assuming k and μ do not change (which they may be expected not to change) as a representation of measured sensing fracture width, $w_{sense}$ (used thereafter).

There will be a general trend of slow reduction of the sensing fracture width $w_{sense}$ and pressure $P_{obs}$ in the observation well as the observation well $W_{obs}$ sensing fracture relaxes. If the sensing fracture is unaffected by actions taken in a nearby treatment well, then there will be no change in the slow pressure and fracture width decay and eventual stabilization of the sensing fracture width $w_{sense}$ and sensing well pressure $P_{obs}$. However, if changes do occur, they can explain the type of interaction between the two wells.

At 1040 in FIG. 10, given changes to the pressure and fracture width trends observed at 1030, one can determine the type(s) of interaction between the sensing fracture in the observation well $W_{obs}$ and the induced fracture(s) from the treated well $W_{treat}$ using pressure trends and sensing fracture width, $w_{sense}$ at $W_{obs}$.

At 1041, there may be no interaction between the sensing fracture and the fracture(s) from the treatment well, i.e., observed ongoing decreasing or flat/stabilized pressure and $w_{sense}$, and referring to FIG. 11 representation and FIG. 12. initial trends in time region I will continue throughout treatment of the treatment well $W_{treat}$ and stabilize.

At 1042, a growing hydraulic fracture from the treatment well $W_{treat}$ hydraulically connecting with the sensing fracture in the observation well $W_{obs}$ will cause the sensing fracture to dilate, and pressure in the observation well ($P_{obs}$) will significantly increase. The foregoing may be observed in FIG. 12 at a. Observation well pressure $P_{obs}$ increases strongly, and the sensing fracture width $w_{sense}$ increases, then both stabilize at higher than initial value. The graphic of this interaction is in FIG. 11 at a.

At 1043, there may be fracture tip to tip interaction (but no fracture bypass). If the growing fracture from the treated well directly approaches the observation well sensing fracture ($W_{obs}$) edge or tip, where there is direct fracture tip-to-tip interaction, graphically depicted by FIG. 11 at graph b the sensing fracture may dilate and shown an increase in fracture width $w_{sense}$. The dilated sensing fracture would intake fluid from $W_{obs}$ wellbore and thus also decrease $P_{obs}$ beyond any natural relaxation/decay trend.

Referring to FIG. 12 graph b, region II, $w_{sense}$ increases along with an observation well pressure and $P_{obs}$ decreases as may be observed in.

At 1044, the growing fracture from the bypassing a pre-existing fracture in the observation well $W_{obs}$. (this may be referred to as "stress shadow") as graphically shown in FIG. 11 at c. A growing fracture from the treatment well will compress the sensing fracture, raising the pressure in the observation well (less so than in case of a direct interaction) $W_{obs}$, and reducing sensing fracture width $w_{sense}$. as can be observed in the progress of strain field FIG. 4a-4d. and reducing its width/conductivity. The measured trend of the observation well pressure $P_{obs}$ and fracture width $w_{sense}$ is in FIG. 12 at c.

At 1050, the operator is alerted of any changes and provided with understanding of the treatment well fracture or fracture system interaction with the observation well sensing fracture $W_{obs}$.

At 1060, the operator can adjust one or more parameters of fracture treatment in the treatment well $W_{treat}$ accordingly (e.g., to prevent fractures from connecting between wells or to reduce the cross-well connection, for example by pumping diverters or reducing the fracture treatment pumping rate).

At 1070 the actions described with reference to 1020-1060 in FIG. 10 are repeated until the fracture treatment in the treatment well $W_{treat}$ is completed. Repeating the process can also provide the operator with time evolution of the fracture interactions. For example, a fracture tip interaction may progress into a fracture connection or is followed by a fracture bypass. One can observe a combination of fracture interactions and referring to FIGS. 11 and 12 panels a, b, c, for example a fracture tip-to-tip interaction shown in panel b, followed by a fracture connection or a fracture bypass shown in panel c. The pressure and width curve would then pick follow the trends of region II in in case of connecting fractures as shown in FIG. 11 in panel a. In case of tip to tip interaction preceding fracture connection, the $P_{obs}$ and $w_{sense}$ changes would follow those FIG. 12 panel d in region II as depicted: Decrease in $P_{obs}$ concurrent with an increase in $w_{sense}$ (tip interaction) will be followed by a rapid $P_{obs}$ rise concurrent with additional $w_{sense}$ rise (fracture connection). A fracture tip interaction followed by fracture bypass is depicted in FIG. 12d, region II. At first, pressure $P_{obs}$ decreases and $w_{sense}$ increases, followed by increase in $P_{obs}$ and decrease of $w_{sense}$ when the growing fracture starts bypassing the sensing fracture.

Below are described additional potential extensions/implications and applications of the basic principles described herein.

$W_{obs}$ and $W_{treat}$ can have multiple stages, each with fracture, that are isolated from each other but may connect through the reservoir. Can have multiple $W_{obs}$—allows better constrain region and extent of the $W_{treat}$ fractures. $W_{obs}$ and $W_{treat}$ can switch back and forth (as in a zipper frac) from stage to stage.

Fracture propagation pressure, $P_{FP}$, is—by definition and given "incompressible" fluid—equal to $P_{obs}$ when the fractures connect (FIG. 12 at a, FIG. 11 at a). The fracture propagation pressure can thus be measured when fractures connect. If fractures only bypass, the maximum observation well pressure $P_{obs}$ when bypass takes place can represent a lower bound on $P_{FP}$. $P_{FP}$ is useful for models and treatment designs.

Fracture bypass can be followed over time as it continues passing approximately parallel to the sensing fracture. When the growing fracture passes $W_{obs}$, measured $w_{sense}$ will increase and $P_{obs}$ decrease showing the decreased stress regime around the wellbore.

If the sensing fracture in the observation well $W_{obs}$ is recent (e.g., within a few hours of creation), pressure decay with respect to time can be fitted and fracture length estimated as in ''977 application Publication cited above. This helps localize the distance of the measured interactions, to help, for example with well spacing: For example if $W_{treat}$ and $W_{obs}$ fractures connect often thus overlapping fracture networks (FIG. 3, at 301), well spacing should be increased to where only a tip interaction between wells is observed (FIG. 3, at 300, 303). If no interaction is observed, wells could be spaced closer. Of course, the treatment design can also be adjusted for shorter or longer fracture length.

It is also possible to observe reverse behavior to better understand reservoir drainage if fluid is being produced from the treatment well W treat.

Case of Fractures Interacting with Stages Below a Bridge Plug in a Well

In some cases, fracture treatment of a well takes place in stages and the stages of treatment are isolated from each other with bridge plugs affixed in the treatment well. All properly set and functioning bridge plugs will prevent fluid from entering a stage below (higher measured depth) it. Some bridge plugs have "ball on seat" or similar construction that enables the bridge plugs to act in the manner of a one-way valve, allowing a fluid of higher pressure to flow across the bridge plug up the well to the surface, but not in the reverse direction.

If the observation well has multiple stages, it is possible that an induced fracture from the treatment $W_{treat}$ will interact with one or more of the fractures in the observation well $W_{obs}$ below the uppermost bridge plug. In some cases, the interaction will increase pressure in the observation well below the uppermost bridge plug sufficiently that a ball is lifted off seat and fluid (and therefore pressure) communication occurs between stages below the uppermost bridge plug and the top of the wellbore. Using only a pressure transducer on the surface, it would not be possible to distinguish if the pressure communication occurs from the current stage or any stage below. However, periodically induced tube waves in the well will change their reflection characteristics.—Reflected tube wave in the wellbore may at least partially reflect from a greater depth. Thus a location and possibly a type of interaction, based on the pressure behavior as previously described can be determined, while the stages are hydraulically connected.

Figure 13:
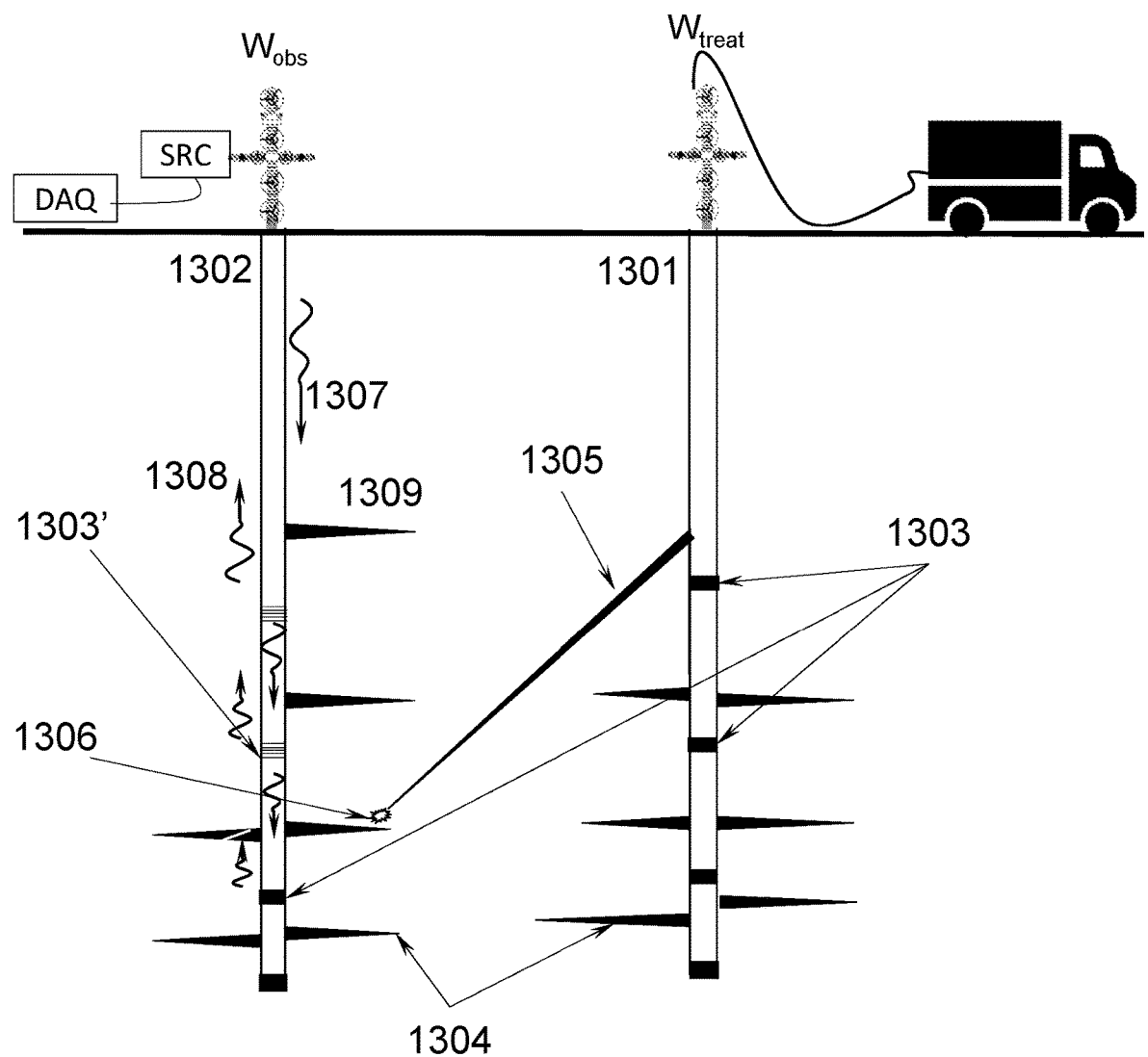
FIG. 13 shows an induced fracture interacting with prior treated stages of the observation well through open bridge plugs.

Referring to FIG. 13, a treatment wellbore 1301, $W_{treat}$, is being treated. Wellbore 1302 is an observation well, $W_{obs}$, and has multiple stages separated by bridge plugs, 1303. Plugs with ball "off seat" feature are shown at 1303'. Black triangles, 1304, represent fractures in the reservoir formation. 1305 represents an induced fracture due to hydraulic fracture treatment. Star 1306 represents a fracture interaction which can take any of the various forms previously described. Tube waves generated by a source, SRC such as explained with reference to FIG. 1 or FIG. 9, traveling downwardly in the wellbore are depicted by arrows 1307. Reflected tube waves are depicted by arrows 1308. 1309 represents a fracture that one may expect to most-likely interact with an induced fracture, e.g., at 1305, but does not interact due to the unusual nature of propagation of the induced fracture 1305. This depiction is for vertical wellbores, but can apply equally to deviated or horizontal wells.

Tube wave travel time can be also related to the depth of the uppermost bridge plug in the wellbore. If the bridge plug is dislodged and moves up or down in the well, the change in tube wave travel time and opening can indicate plug motion up/down the wellbore.

Case of Monitoring a Closed Wellbore (Isolated Section of a Wellbore without a Hydraulic Connection to the Reservoir)

Figure 14:
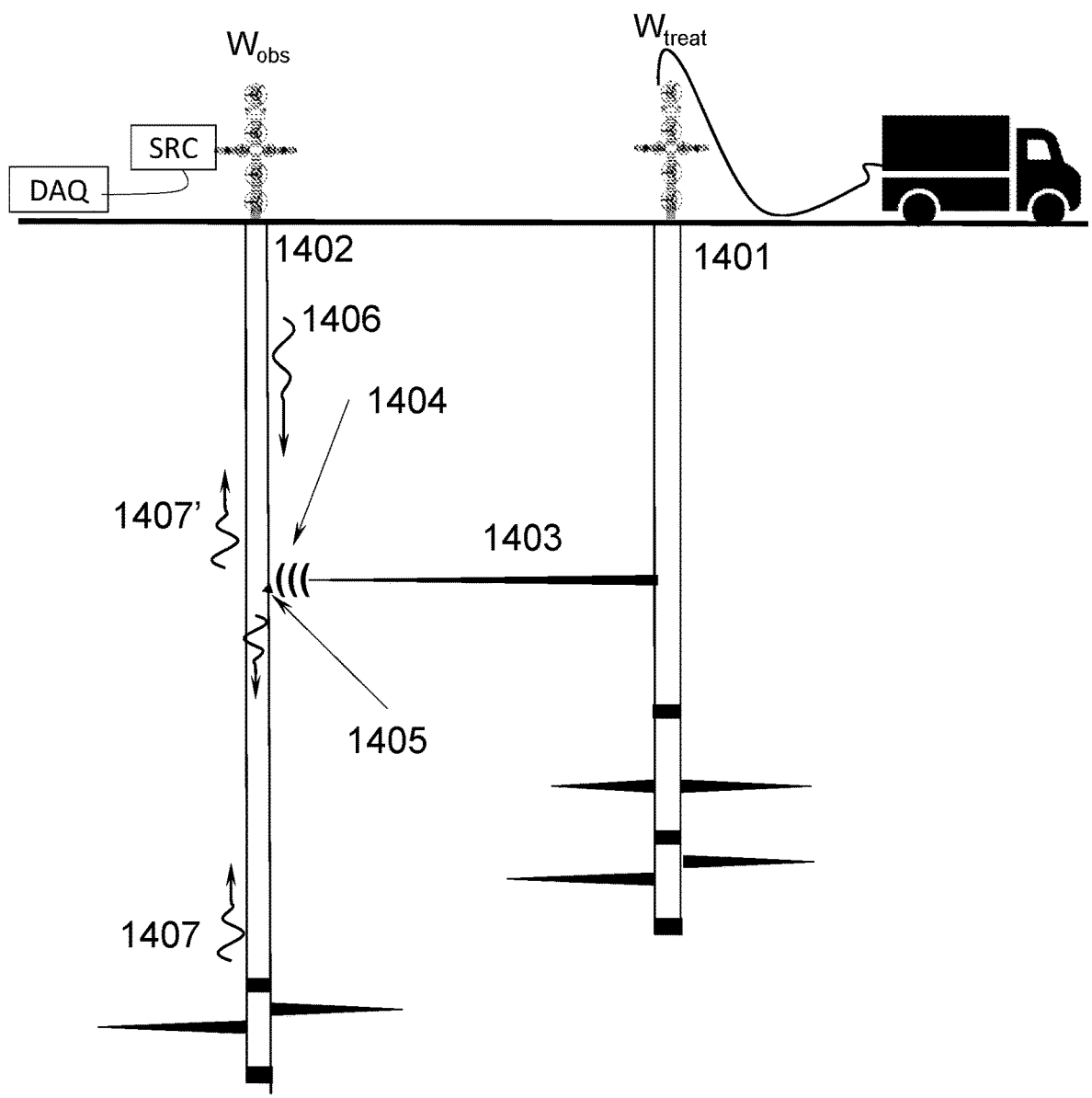
FIG. 14 shows an induced fracture interacting with a closed (portion of a) wellbore that has no hydraulic connection to the reservoir.

In some cases, for example prior to any fracturing treatment, a well may be sealed off from a hydraulic connection with the reservoir formation and closed on the surface to any flow in or out of the well while maintaining some base pressure (or a fluid level column relatable to pressure). Such as well could be, for example, a drilled but uncompleted wellbore, or it could be a recently treated wellbore having a bridge plug completely isolating prior treated stage(s) from the wellbore above the bridge plug. Referring to FIG. 14, such a closed well is shown at 1402. An induced fracture, 1403, from a treatment well, 1401, $W_{treat}$ can reach and affect the casing of the closed well 1402. Such interaction can stress (1404), dent (1405), or even breach, the casing in the closed well 1402. By instrumenting the closed well 1402 with equipment such as explained with reference to FIG. 1 or FIG. 9, it is possible to monitor both fluid pressure and tube wave propagation in the closed well 1402 while performing treatment on the treatment well 1401. The tube waves will propagate down from the source, SRC, as shown by arrows 1406, and reflect up from the bottom, or a casing deformity, as shown in 1407 and 1407' respectively. The speed of the tube wave can be calibrated by known well depth and reflected wave travel time in an undisturbed wellbore tube wave speed=(2*depth_/(reflection return time).

Provided an induced fracture approaches the wellbore, it will stress it, 1404, resulting in an increase in pressure that can be measured with sensors as explained above. The approximate location of the stress (and thus a leading edge of the induced fracture from the treatment well 1401 may be determined by characteristics and changes of the tube waves, namely travel time and reflection characteristics. For example a small compression or a dent, 1405, in the wellbore or casing will create a tube-wave reflection point. The newly reflected tube wave returning to the surface is shown by arrow 1407'. With known tube wave travel speed, the tube wave reflection travel time (from the top of the well to the dent 1405 and back) can be related to the distance of the dent. Additional interactions of induced fracture with a closed wellbore can be distinguished such as a wellbore breach (results in a sudden spike in pressure). The location can be also determined by a tube wave travel time from this reflection point. Multiple interactions can also be determined and located. Additional changes in wellbore fluid composition, temperature, or properties can be determined from the tube waves according to U.S. Pat. No. 9,103,203 issued to Miller. Some of these changes in properties can be related to the effects of a pumping nearby treatment (such as cooling of the wellbore through bypassing injected fluid).

REFERENCES CITED IN THE PRESENT DISCLOSURE

1. USGS—Strainmeters, accessed on Nov. 28, 2018. https://earthquake.usgs.gov/monitoring/deformation/data/instruments.php
2. Daneshy, A. A. (2014, October 27). *Fracture Shadowing: Theory, Applications and Implications*. Society of Petroleum Engineers. doi:10.2118/170611-MS
3. Fracture width and conductivity determination: U.S. Patent Application Publication No. 2018/0320514
4. McClure & Kang 2017: SPE 182593, *A Three-Dimensional Reservoir, Wellbore, and Hydraulic Fracturing Simulator that is Compositional and Thermal, Tracks Proppant and Water Solute Transport, Includes Non-Darcy and Non-Newtonian Flow, and Handles Fracture Closure*
5. McClure & Kang 2018: SPE 190049, *Applying a Combined Hydraulic Fracturing, Reservoir, and Wellbore Simulator: Staged Field Experiment #3, Cluster Spacing, and Stacked Parent/Child Frac Hits*
6. Barton, N., S. Bandis, K. Bakhtar. 1985. *Strength, deformation and conductivity coupling of rock joints*. International Journal of Rock Mechanics and Mining Sciences & Geomechanics Abstracts 22 (3): 121-140.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for determining change in stress in a reservoir formation, comprising:
    inducing a pressure pulse in a first well hydraulically connected by a first fracture to the reservoir formation, the pressure pulse inducing tube waves in the first well;
    determining a stress-related attribute of the first fracture from tube wave reflection events detected in pressure measurements made in the first well as a result of the inducing the pressure pulse;
    determining fluid pressure in the first well;
    pumping an hydraulic fracture treatment into the reservoir formation through a second well spaced apart from the first well; and
    repeating the inducing and determining the stress related attribute and the determining fluid pressure to estimate changes in the stress-related attribute with respect to time resulting from the pumping the hydraulic fracture treatment through the second well.

2. The method of claim 1, wherein the stress-related attribute comprises a proximity of a second fracture in the reservoir formation induced by the pumping the hydraulic fracture treatment.

3. The method of claim 2, wherein stress-related attribute comprises a location of a fracture tip of the second fracture.

4. The method of claim 2 wherein the second fracture is induced by pumping a treatment into a formation interval in the first well isolated from a formation interval comprising the first fracture.

5. The method of claim 2, wherein the stress-related attribute comprises propagation with respect to time of the second fracture.

6. The method of claim 5 further comprising repeating the inducing a pressure pulse and determining the stress-related attribute while pumping the treatment into the second well.

7. The method of claim 6, further comprising treating the reservoir formation by pumping a treatment into the reservoir formation from the first well, and inducing a pressure pulse and determining the stress-related attribute in the second well.

8. The method of claim 1, wherein the first fracture connecting the first well is induced by a hydraulic fracturing treatment.

9. The method of claim 8, wherein the first fracture is induced by a performing a diagnostic fracture injection test on the first well.

10. The method of claim 9, wherein the first fracture is induced by injection of a fluid of known volume into the first well.

11. The method of claim 1, wherein the first fracture comprises a pre-existing natural fracture.

12. The method of claim 1, wherein the stress-related attribute comprises at least one of fracture width, fracture length, fracture height and fracture permeability.

13. The method of claim 1 wherein the pressure pulse induces tube waves in the first well.

14. The method of claim 1, further comprising inducing a pressure pulse in a third well, and determining the stress-related attribute of the first fracture from reflection events detected in pressure measurement made in the third well as a result of the inducing the pressure pulse in the third well.

15. The method of claim 14 further comprising repeating the inducing and determining in the third well and estimating changes in the stress-related attribute with respect to time.

16. The method of claim 1 further comprising adjusting at least one parameter related to pumping an hydraulic fracture treatment in the second well, and either (i) repeating the pumping the hydraulic fracture treatment in the second well or (ii) pumping an hydraulic fracture treatment into the first well.

17. The method of claim 1 wherein the tube wave events are detected by measuring time derivative of fluid pressure in the well.

18. The method of claim 1 wherein the determining fluid pressure in the well comprises measuring pressure.

* * * * *